United States Patent
Sato et al.

(10) Patent No.: US 7,793,973 B2
(45) Date of Patent: Sep. 14, 2010

(54) SIDE AIRBAG APPARATUS

(75) Inventors: Eiji Sato, Aichi-ken (JP); Toshinori Tanase, Aichi-ken (JP); Satoshi Mabuchi, Aichi-ken (JP); Toru Koyama, Aichi-ken (JP); Motoaki Naruse, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/723,979

(22) Filed: Mar. 23, 2007

(65) Prior Publication Data

US 2007/0170707 A1 Jul. 26, 2007

Related U.S. Application Data

(63) Continuation of application No. 10/382,642, filed on Mar. 7, 2003, now abandoned.

(30) Foreign Application Priority Data

| Mar. 11, 2002 | (JP) | ............................ | 2002-065998 |
| Mar. 11, 2002 | (JP) | ............................ | 2002-065999 |
| Jun. 12, 2002 | (JP) | ............................ | 2002-171640 |
| Jun. 12, 2002 | (JP) | ............................ | 2002-171641 |
| Jun. 12, 2002 | (JP) | ............................ | 2002-171642 |
| Jul. 30, 2002 | (JP) | ............................ | 2002-220748 |

(51) Int. Cl.
*B60R 21/16* (2006.01)

(52) U.S. Cl. .................. 280/730.2; 280/729; 280/743.2

(58) Field of Classification Search ................. 280/729, 280/730.2, 730.1, 739, 740, 743.1, 743.2
See application file for complete search history.

(56) References Cited

U.S. PATENT DOCUMENTS 5,112,079 A 5/1992 Haland et al.

5,524,924 A 6/1996 Steffens, Jr. et al.

(Continued)

FOREIGN PATENT DOCUMENTS

DE 196-46-698 5/1997

(Continued)

OTHER PUBLICATIONS

Office Communication from Japanese Patent Office mailed on Mar. 13, 2007 for the corresponding Japanese patent application No. 2002-171642.

(Continued)

*Primary Examiner*—Eric Culbreth
(74) *Attorney, Agent, or Firm*—Posz Law Group, PLC

(57) ABSTRACT

A side airbag apparatus for vehicle has an airbag and an inflator. An upper chamber, a lower chamber, and an intermediate chamber are defined by a seam in the airbag. When the airbag is deployed, the upper chamber corresponds to a shoulder of an occupant, the lower chamber corresponds to a lumbar region of the occupant, and the intermediate chamber corresponds to a thorax of the occupant. The seam guides gas from the inflator to the upper and lower chambers such that the upper and lower chambers are substantially simultaneously inflated, and the intermediate chamber is inflated after a delay. The thickness of the intermediate chamber is less than the thicknesses of the upper and lower chambers. As a result, the occupant of the vehicle is effectively protected.

30 Claims, 16 Drawing Sheets

U.S. PATENT DOCUMENTS

| | | | |
|---|---|---|---|
| 5,556,128 | A | 9/1996 | Sinnhuber et al. |
| 5,586,782 | A | 12/1996 | Zimmerman et al. |
| 5,593,179 | A | 1/1997 | Maruyama |
| 5,692,774 | A | 12/1997 | Acker et al. |
| 5,722,685 | A | 3/1998 | Eyrainer |
| 5,791,685 | A | 8/1998 | Lachat et al. |
| 5,829,779 | A | 11/1998 | Nakashima et al. |
| 6,032,977 | A | 3/2000 | Reh et al. |
| 6,206,411 | B1 | 3/2001 | Sunabashiri |
| 6,508,486 | B1 | 1/2003 | Welch et al. |
| 6,561,539 | B1 | 5/2003 | Sunabashiri et al. |
| 6,991,257 | B2 | 1/2006 | Zhao et al. |

FOREIGN PATENT DOCUMENTS

| | | |
|---|---|---|
| DE | 196-05-620 | 8/1997 |
| JP | A-02-249740 | 10/1990 |
| JP | A-H05-004553 | 1/1993 |
| JP | A-06-227348 | 8/1994 |
| JP | 06-344844 | 12/1994 |
| JP | A-H07-125585 | 5/1995 |
| JP | A-07-164996 | 6/1995 |
| JP | 07-329667 | 12/1995 |
| JP | H7-323802 | 12/1995 |
| JP | A-H8-169294 | 7/1996 |
| JP | 09-136595 | 5/1997 |
| JP | A-09-272394 | 10/1997 |
| JP | A-H9-272393 | 10/1997 |
| JP | A-09-309399 | 12/1997 |
| JP | 10-059113 | 3/1998 |
| JP | A-H10-67297 | 3/1998 |
| JP | A-10-166981 | 6/1998 |
| JP | A-H10-181498 | 7/1998 |
| JP | 10-273010 | 10/1998 |
| JP | A-10-273010 | 10/1998 |
| JP | A-10-287195 | 10/1998 |
| JP | A-10-324214 | 12/1998 |
| JP | 11-048906 | 2/1999 |
| JP | A-11-091477 | 4/1999 |
| JP | 11-152007 | 6/1999 |
| JP | A-11-180244 | 7/1999 |
| JP | A-11-278195 | 10/1999 |
| JP | A-2000-016213 | 1/2000 |
| JP | A-2000-85515 | 3/2000 |
| JP | 2000-177527 | 6/2000 |
| JP | A-2000-177526 | 6/2000 |
| JP | A-2000-177527 | 6/2000 |
| JP | 2000-280853 | 10/2000 |
| JP | A-2000-289556 | 10/2000 |
| JP | A-2000-318565 | 11/2000 |
| JP | A-2001-030862 | 2/2001 |
| JP | 2001-206176 | 7/2001 |
| JP | A-2001-219808 | 8/2001 |
| JP | 2001-277992 | 10/2001 |
| WO | WO 02/100690 | 12/2002 |
| WO | WO 02/100691 | 12/2002 |

OTHER PUBLICATIONS

Office Communication from Japanese Patent Office mailed on Mar. 13, 2007 for the corresponding Japanese patent application No. 2002-171641.

Office Action dated Nov. 24, 2009 issued from the Japanese Patent Office for the corresponding Japanese patent application No. 2007-125576.

Office Action dated Jul. 21, 2009 issued from the Japanese Patent Office for the corresponding Japanese patent application No. 2007-125576.

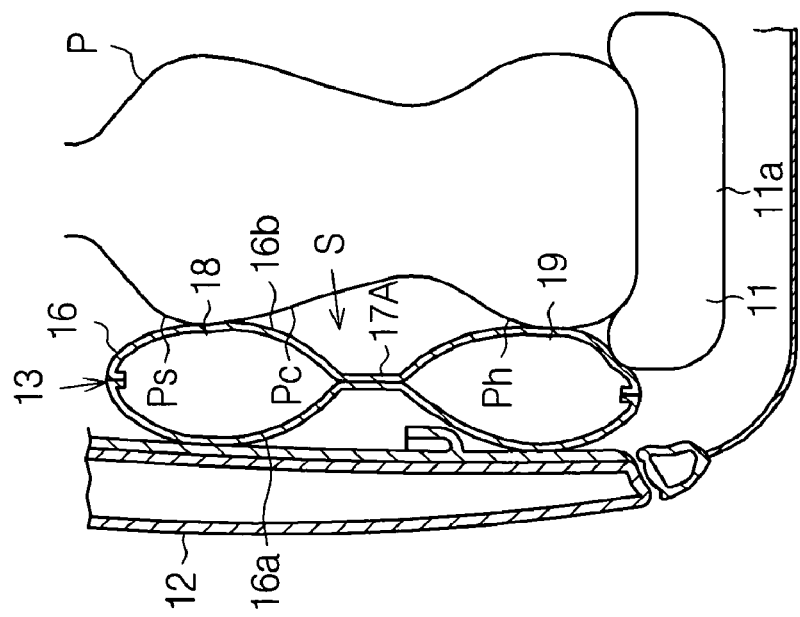
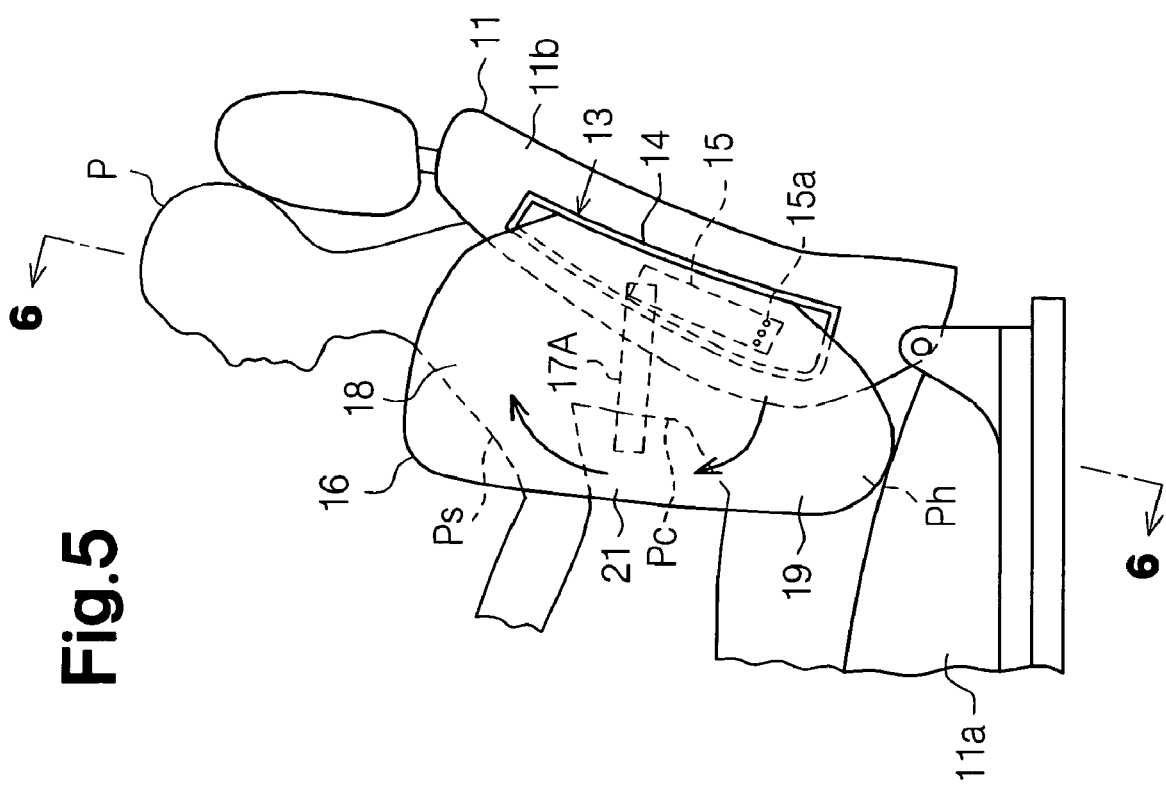

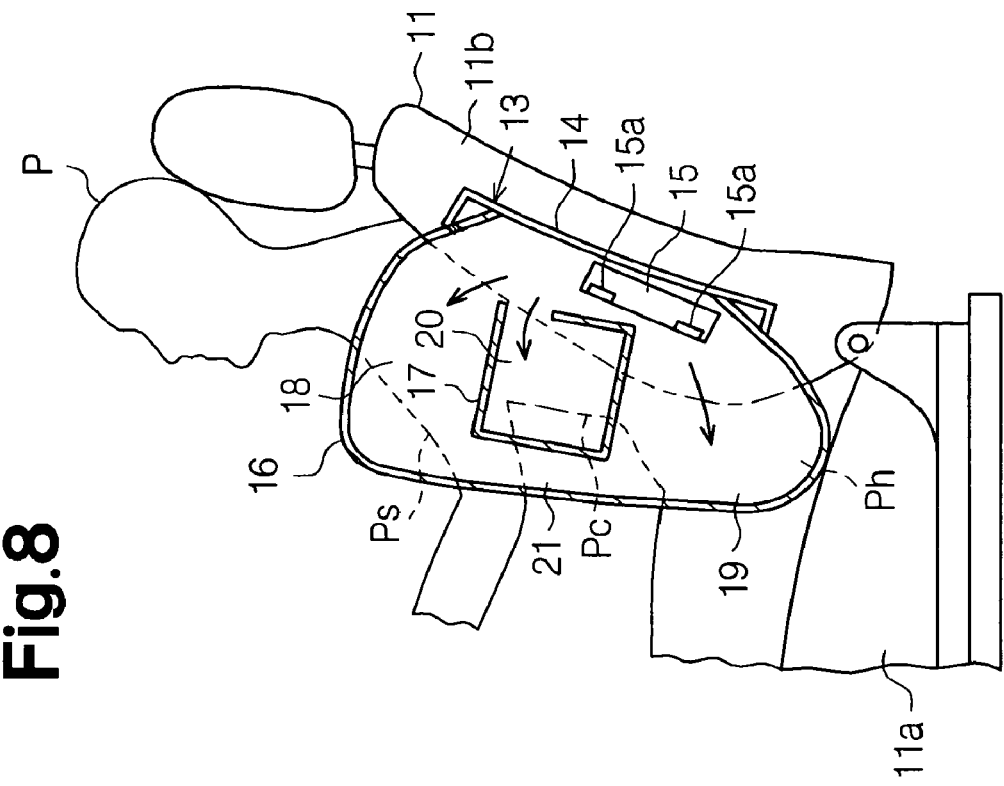
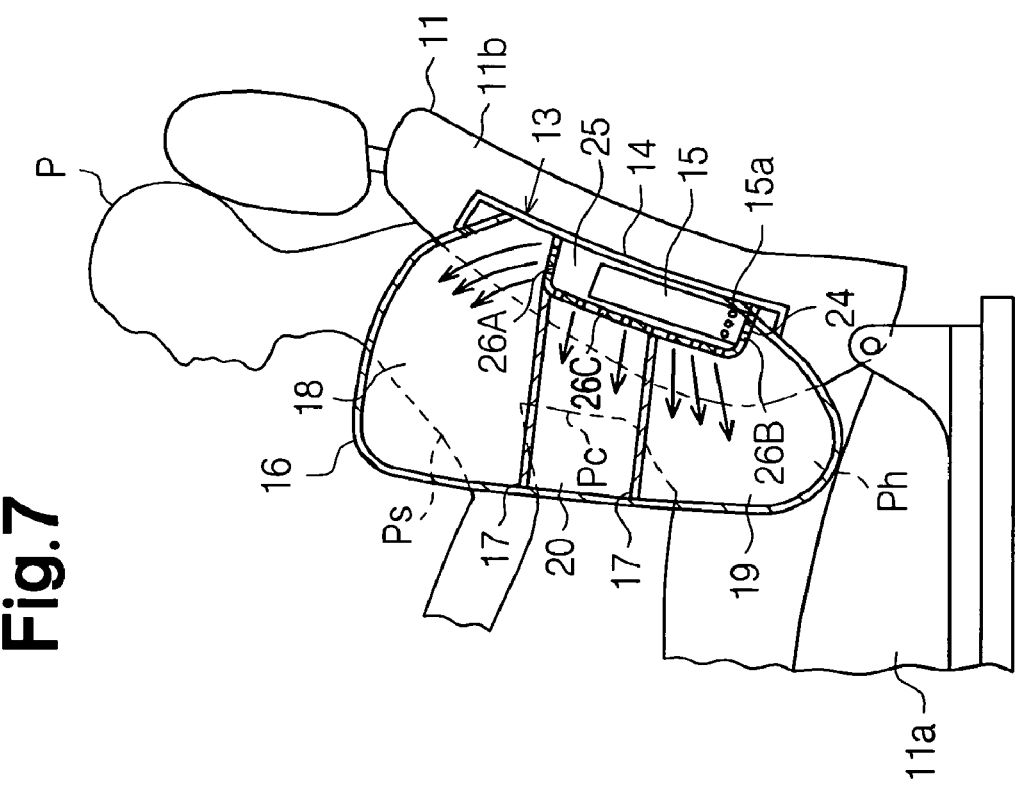

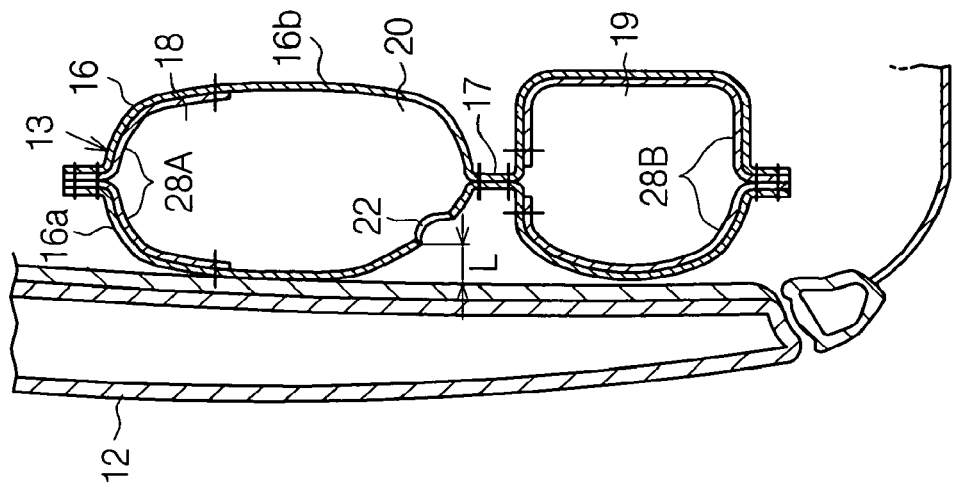
Fig.16
Fig.17

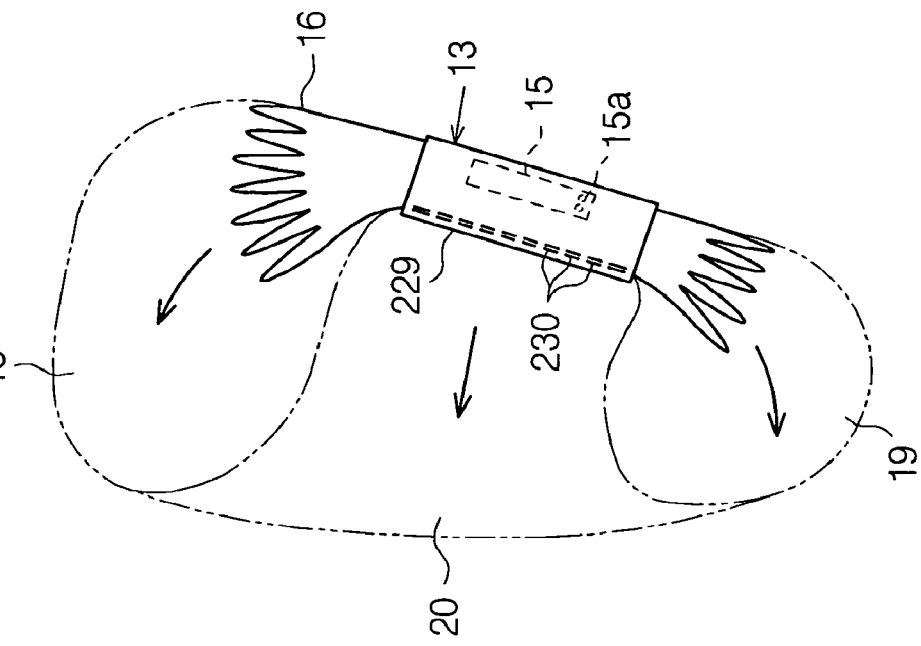
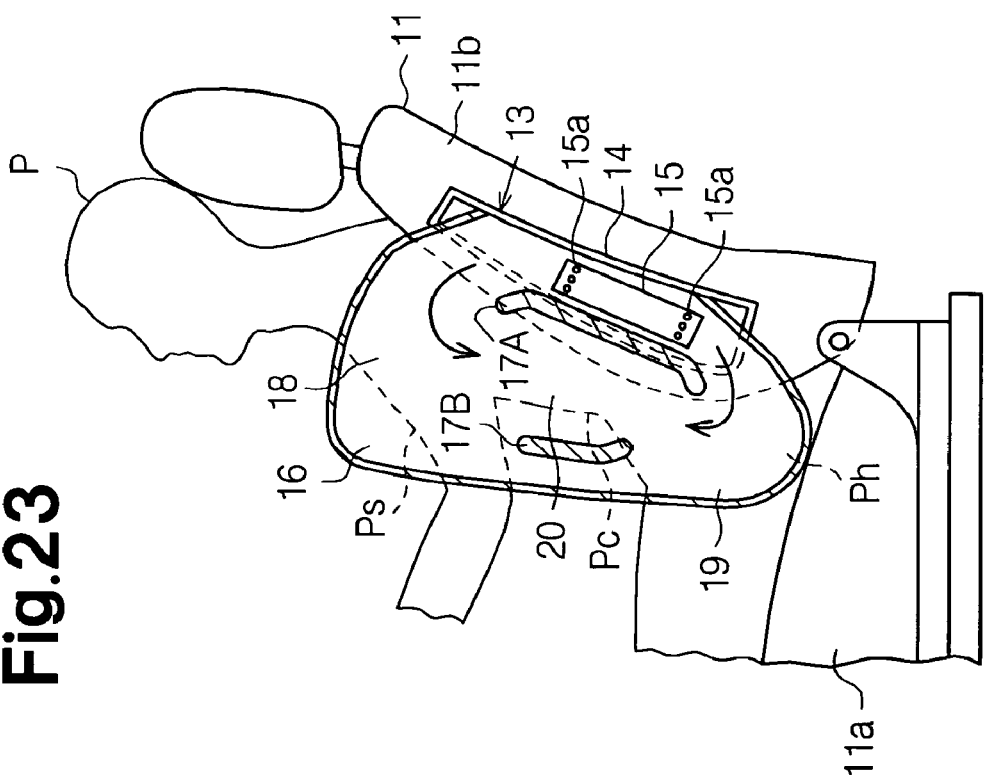

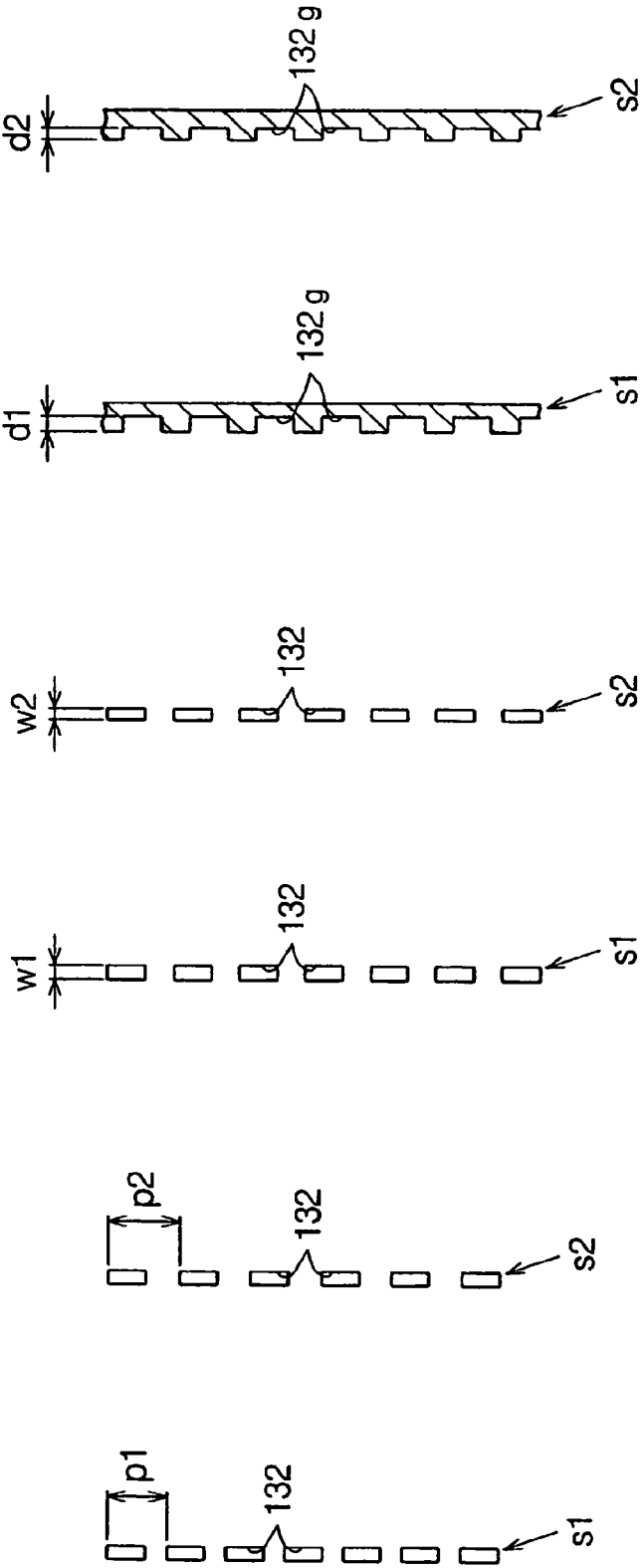

SIDE AIRBAG APPARATUS

CROSS REFERENCE TO RELATED APPLICATION

This application is a continuation application of U.S. Ser. No. 10/382,642, which was filed on Mar. 7, 2003, and such parent application (U.S. Ser. No. 10/382,642) is hereby incorporated by reference.

BACKGROUND OF THE INVENTION

The present invention relates to an airbag apparatus having an airbag that is deployed at a side of an occupant of a vehicle when an impact of a force greater than a predetermined value is applied to a side of the vehicle body due to a side collision.

Such side airbag apparatuses have been disclosed in, for example, Japanese Laid-Open Patent Publication No. 2000-177527 (first prior art), Japanese Laid-Open Patent Publication No. 2000-280853 (second prior art), and U.S. Pat. No. 5,112,079 (third prior art).

In the first prior art, as represented by FIG. 34, a side airbag apparatus 542 is mounted in a backrest 541a of a vehicle seat 541 as shown in FIG. 34. The interior of an airbag 543 of the side airbag apparatus 542 is divided by a dividing seam 544 into a first chamber 545 and a second chamber 546. The first chamber 545 inflates at a side of the thorax Pc of an occupant P sitting on the vehicle seat 541. The second chamber 546 inflates at a side of the lumbar region Ph of the occupant P.

The side airbag apparatus 542 has a gas generator 547 for deploying the airbag 543. A pre-chamber 548 is located about the gas generator 547. The pre-chamber 548 is connected to the first chamber 545 through first small holes 549 and to the second chamber 546 through second small holes 550. The total opening area of the first small holes 549 is less than the total opening area of the second small holes 550.

When an impact of a force that is greater than a predetermined value is applied to the side of the vehicle body due to a side collision, the gas generator 547 generates gas, which is first supplied to the pre-chamber 548. The gas is then supplied to the first and second chambers 545, 546 through the first and second small holes 549, 550 of different total opening areas at different flow rates. Due to the difference of the gas flow rates, the first and second chambers 545, 546 are inflated such that the internal pressure of the first chamber 545 is lower than the internal pressure of the second chamber 546.

In the second prior art, as represented by FIG. 35, also, a side airbag apparatus 642 is mounted in a backrest 641a of a vehicle seat 641 as shown in FIG. 35. The interior of an airbag 643 of the side airbag apparatus 642 is divided into a first deployment region 652 and a second deployment region 653 by a substantially vertical dividing wall 651. The first deployment region 652 inflates at a position that is at rear of an arm Pa of the occupant P. The second deployment region 653 inflates to contact the arm Pa. During a side collision, a gas generator 647 generates gas, which immediately inflates the first deployment region 652 from the lower part to the upper part. After a delay, the second deployment region 653 is inflated from the lower part to the upper part.

The third prior art discloses a side airbag apparatus having a large airbag. This airbag is deployed to cover a large area including the head and the lumbar region of an occupant.

In the first prior art, the first chamber 545, which corresponds to the thorax Pc of the occupant P is inflated with a pressure that is lower than that of the second chamber 546, which corresponds to the lumbar region Ph. Therefore, the thorax Pc, which is relatively vulnerable to impacts, is more softly received compared to the lumbar region Ph. Therefore, the impact of a side collision is not greatly applied to the thorax. However, since the internal pressure of the first chamber 545 corresponding to the thorax Pc is relatively low, if the body side portion of the vehicle is greatly deformed inward of the passenger compartment due to a side collision, the thorax Pc might not be sufficiently protected.

In the second prior art, the vertically extending first and second deployment regions 652, 653 are inflated substantially with the same pressure. Therefore, the part of the body of the occupant P from a shoulder Ps to the lumbar region Ph is uniformly contacts the inflated airbag 643. Therefore, like the first prior art, the thorax Pc might not be sufficiently protected.

The third prior art discloses the largely deployable airbag that simply protects the body of an occupant over a large area, but does not disclose any deployment modes of the airbag to correspond to specific parts of the occupant's body. Therefore, the third prior art is not expected to effectively protect occupants by taking the characteristics of a human body into consideration.

SUMMARY OF THE INVENTION

Accordingly, it is an objective of the present invention to provide a side airbag apparatus that effectively protects occupants.

To achieve the foregoing and other objectives and in accordance with the purpose of the present invention, a side airbag apparatus used in a vehicle is provided. The apparatus includes an airbag, an inflator, and a gas guiding mechanism. The inflator supplies gas to the airbag, thereby deploying the airbag between a body side portion of the vehicle and a seat located in the passenger compartment of the vehicle. An upper chamber and a lower chamber are provided in the airbag. When the airbag is deployed, the upper chamber is located at a position that corresponds to a shoulder of an occupant sitting on the seat and the lower chamber is located at a position that corresponds to a lumbar region of the occupant. The gas guiding mechanism guides gas from the inflator to the upper and lower chambers, thereby substantially simultaneously inflating the upper and lower chambers.

The present invention also provides another side airbag apparatus used in a vehicle. The apparatus includes an airbag, an inflator, and a limiting mechanism. The inflator supplies gas to the airbag, thereby deploying the airbag between a body side portion of the vehicle and a seat located in the passenger compartment of the vehicle. An upper deploying portion, a lower deploying portion, and an intermediate portion are provided in the airbag. When the airbag is deployed, the upper deploying portion is located at a position that corresponds to a shoulder of an occupant sitting on the seat, the lower deploying portion is located at a position that corresponds to a lumbar region of the occupant, and the intermediate portion is located at a position that corresponds to a thorax of the occupant. When the airbag is deployed, the limiting mechanism limits bulging of the intermediate portion such that the thickness of the intermediate portion is less than the thickness of the upper and lower deploying portions in respect to a horizontal direction between the occupant and the body side portion.

In another aspect of the present invention, another side airbag apparatus used in a vehicle is provided. The apparatus includes an airbag, an inflator, and a promoting mechanism. The inflator supplies gas to the airbag, thereby deploying the airbag between a body side portion of the vehicle and a seat located in the passenger compartment of the vehicle. An upper chamber, a lower chamber, and an intermediate chamber are provided in the airbag. When the airbag is deployed, the upper chamber is located at a position that corresponds to a shoulder of an occupant sitting on the seat, the lower chamber is located at a position that corresponds to a lumbar region of the occupant, and the intermediate chamber is located at a position that corresponds to a thorax of the occupant. When the inflator generates gas, the promoting mechanism promotes inflation of the upper and lower chambers compared to inflation of the intermediate chamber.

In a further aspect of the present invention, another side airbag apparatus used in a vehicle is provided. The apparatus includes an airbag, an inflator, and a delaying mechanism. The inflator supplies gas to the airbag, thereby deploying the airbag between a body side portion of the vehicle and a seat located in the passenger compartment of the vehicle. An upper chamber, a lower chamber, and an intermediate chamber are provided in the airbag. When the airbag is deployed, the upper chamber is located at a position that corresponds to a shoulder of an occupant sitting on the seat, the lower chamber is located at a position that corresponds to a lumbar region of the occupant, and the intermediate chamber is located at a position that corresponds to a thorax of the occupant. When the inflator generates gas, the delaying mechanism delays inflation of the intermediate chamber compared to inflation of the upper and lower chambers.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a cross-sectional view illustrating a side airbag according to a second embodiment of the present invention;

FIG. 6 is an enlarged partial cross-sectional view taken along line 6-6 of FIG. 5;

FIG. 7 is a cross-sectional view illustrating a side airbag according to a third embodiment of the present invention;

FIG. 8 is a cross-sectional view illustrating a side airbag according to a fourth embodiment of the present invention;

FIG. 16 is a cross-sectional view illustrating a side airbag apparatus according to a ninth embodiment of the present invention;

FIG. 17 is an enlarged partial cross-sectional view taken along line 17-17 of FIG. 16;

FIG. 23 is a cross-sectional view illustrating a side airbag apparatus according to a twelfth embodiment of the present invention;

FIG. 24 is a cross-sectional view illustrating a side airbag apparatus according to a thirteenth embodiment of the present invention;

FIGS. 27(a) and 27(b) are enlarged partial cross-sectional views showing an example of perforations;

FIGS. 28(a) and 28(b) are enlarged partial cross-sectional views showing another example of perforations;

FIGS. 29(a) and 29(b) are enlarged partial cross-sectional views showing a further example of perforations;

DETAILED DESCRIPTION OF THE PREFERRED EMBODIMENTS

A first embodiment of the present invention will now be described with reference to FIGS. 1 to 4.

Figure 1:
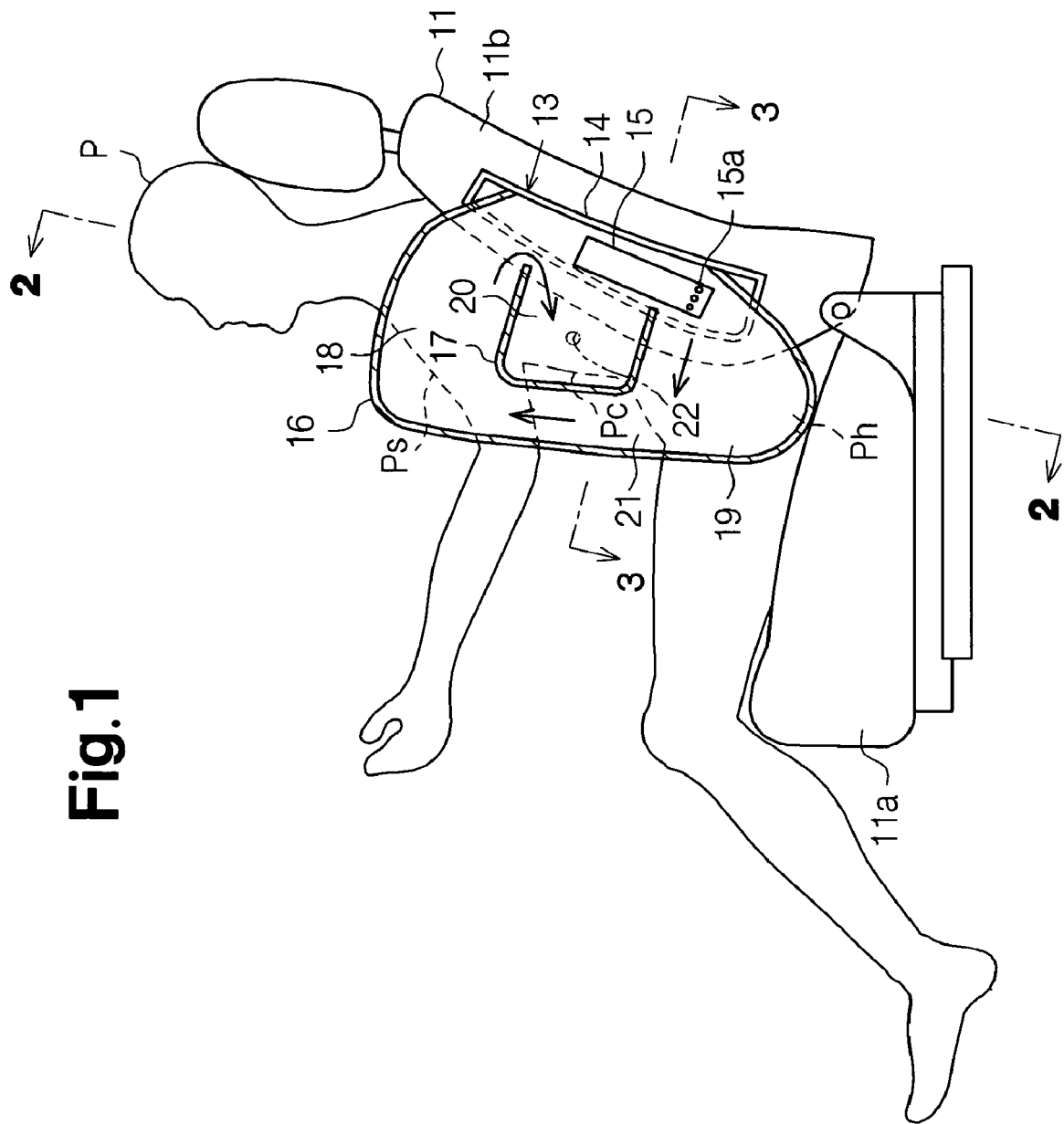
FIG. 1 is a cross-sectional view illustrating a side airbag according to a first embodiment of the present invention.
Figure 2:
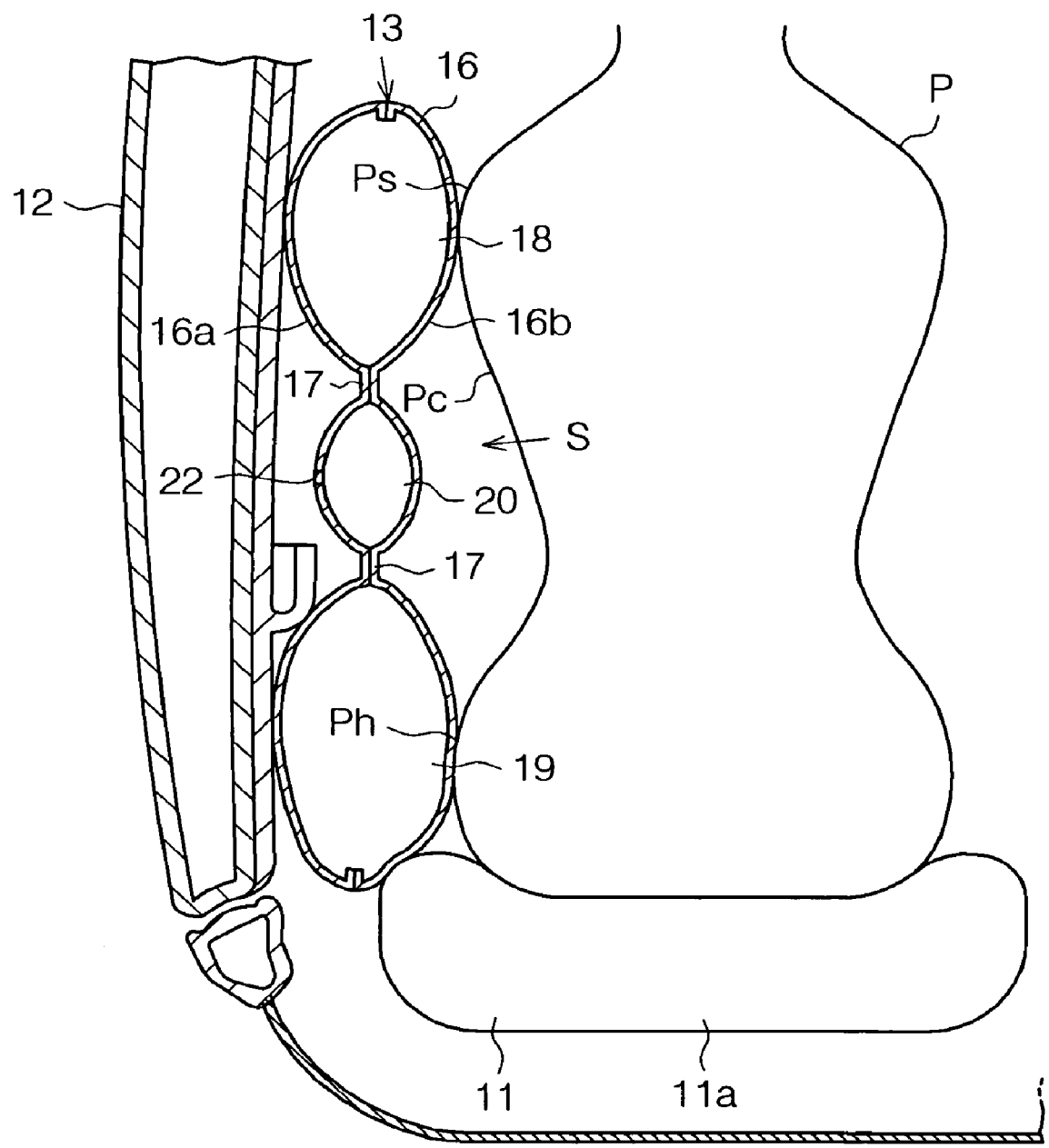
FIG. 2 is an enlarged partial cross-sectional view taken along line 2-2 of FIG. 1.
Figure 3:
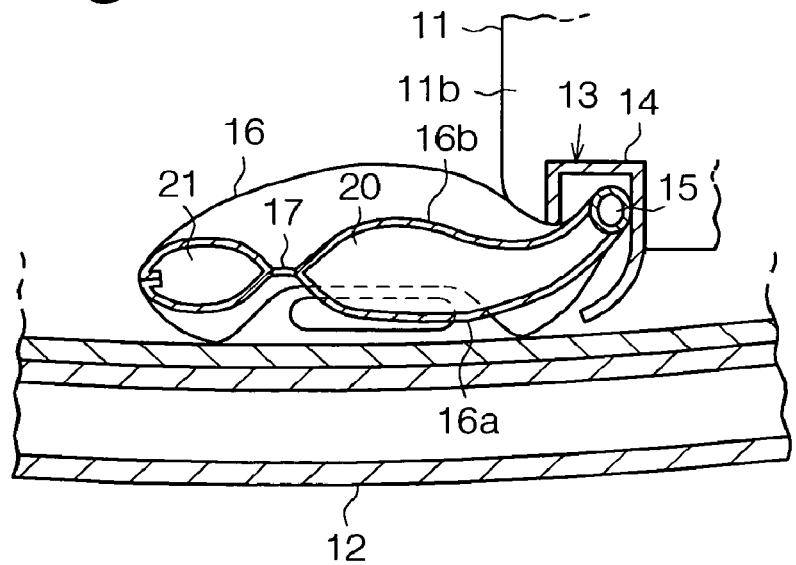
FIG. 3 is an enlarged partial cross-sectional view taken along line 3-3 of FIG. 1.

FIGS. 1 to 3 show a side airbag apparatus 13 provided in a left front seat 11 in a vehicle passenger compartment. The front seat 11 includes a seat portion 11a and a backrest 11b. A case 14 accommodating the side airbag apparatus 13 is embedded in the left portion of the backrest 11b to correspond to a door 12, which consists part of a side portion of the vehicle body. Although only the left front seat 11 is illustrated in the drawings, a right front seat has a similar airbag apparatus in its right portion.

The side airbag apparatus 13 includes a gas generator, which is an inflator 15, and an airbag 16. The inflator 15 is fixed in the case 14. The airbag 16 covers the inflator 15. The inflator 15 has a case and gas generation agent (not shown) in the case. The gas generation agent generates gas to deploy the airbag 16. Gas portion is formed at a lower portion of the inflator 15. In this embodiment, the gas portion is a plurality of gas ports 15a.

The inflator 15 is electrically connected to an impact sensor (not shown) that detects the magnitude of impact applied to the body side portion. When an object, such as another vehicle, collides with the body side portion, that is, during a side collision, if an impact having a magnitude that is greater than a predetermined value is applied to the body side portion, a control circuit (not shown) sends driving current to the inflator 15 based on detection signal from the impact sensor. Ignition based on the driving current causes the gas generating agent in the inflator 15 to generate gas. The gas is in turn injected from the gas ports 15a into the airbag 16.

As shown in FIGS. 2 and 3, the airbag 16 has a pair of fabric sheets 16a, 16b made of, for example, woven cloth. The fabric sheets 16a, 16b are sewn together at the periphery to form the airbag 16. Normally, the airbag 16 is accommodated in the case 14 in a folded state.

When the inflator 15 generates gas, the airbag 16 is deployed into the space between the door 12 and the front seat 11 to spread over the torso of an occupant P sitting on the front seat 11 from a shoulder Ps to a lumbar region Ph.

A seam 17 is formed in a section of the airbag 16 that is substantially center in the vertical direction. The seam 17 is formed by sewing the fabric sheets 16a, 16b and is substantially laterally U-shaped as viewed from the side. The seam 17 defines an upper chamber 18, a lower chamber 19, and an intermediate chamber 20. The intermediate chamber 20 is located between the upper chamber 18 and the lower chamber 19 and functions as an intermediate portion. The intermediate chamber 20 is surrounded by the seam 17 on three sides. The airbag 16 has a gas passage 21 formed between the edge of the airbag 16 and the seam 17. The gas passage 21 is located at a side of the airbag 16 opposite from the inflator 15, in other words, at a side opposite from the opening of the intermediate chamber 20.

As shown by arrows in FIG. 1, gas injected from the gas ports 15a of the inflator 15 is first guided to the lower chamber 19. The gas is then guided to the upper chamber 18 from the lower chamber 19 along the seam 17 via the gas passage 21. Thereafter, the gas in the upper chamber 18 is guided to the intermediate chamber 20 while bypassing the upper edge of the seam 17. Therefore, as obvious from FIG. 4, the lower chamber 19 is first inflated (at a position corresponding to the lumbar region Ph of the occupant P). Substantially simultaneously, the upper chamber 18 is inflated (at a position corresponding to the shoulder Ps of the occupant P). Thereafter, the intermediate chamber 20 is inflated (at a position corresponding to the thorax Pc of the occupant P). The seam 17 has a gas guiding function and guides gas to substantially simultaneously inflate the upper and lower chambers 18, 19. The seam 17 has a function to promote the inflation of the upper and lower chambers 18, 19, or a function to delay the inflation of the intermediate chamber 20.

A vent hole 22 is formed at a part of the airbag 16, specifically, at the part corresponding to the intermediate chamber 20. The vent hole 22 discharges gas from the interior of the intermediate chamber 20.

When forming the laterally U-shaped seam 17, the fabric sheets 16a, 16b are sewed such that the portions of the fabric sheets 16a, 16b surrounded by the seam 17 will be restrained upon deployment of the airbag 16. Therefore, the thickness (horizontal measurement) of the intermediate chamber 20 is less than those of the upper chamber 18 and the lower chamber 19 as shown in FIG. 2 when the airbag 16 is deployed. That is, the seam 17 functions to limit bulging of the intermediate chamber 20. As obvious from FIG. 4, the vent hole 22 formed in a part corresponding to the intermediate chamber 20 adjusts the internal pressure of the intermediate chamber 20 to be lower than those of the upper and lower chambers 18, 19. The vent hole 22 thus has an internal pressure adjusting function.

Various conditions, such as the pressure of gas supplied from the inflator 15 to the airbag 16 and the size of the vent hole 22, are determined such that the internal pressures of the chambers 18 to 20 are in predetermined appropriate ranges. Specifically, the conditions are determined such that the internal pressures of the upper and lower chambers 18, 19 are in a range from 150 to 200 kilo pascals (kPa), and the internal pressure of the intermediate chamber 20 is in a range from 50 to 100 kilo pascals (kPa). The internal pressure of the intermediate chamber 20 is preferably equal to or less than the lower one of the internal pressures of the upper chamber 18 and the lower chamber 19. When the internal pressures in the upper and lower chambers 18, 19 are equal to each other, the internal pressure of the intermediate chamber 20 is preferably equal to or less than a half of the internal pressures in the upper and lower chambers 18, 19.

Various conditions such as the location and the size of the seam 17 are determined such that the thicknesses of the chambers 18 to 20 are in the following ranges. That is, the conditions are determined such that the thicknesses of the upper and lower chambers 18, 19 are in a range from 150 mm to 200 mm, and the thickness of the intermediate chamber 20 is in a range from 50 mm to 130 mm. If the thicknesses of the upper and lower chambers 18, 19 are equal to each other, the thickness of the intermediate chamber 20 is preferably a quarter to a third of the thicknesses of the upper and lower chambers 18, 19. If the thicknesses of the upper and lower chambers 18, 19 are different from each other, the thickness of the intermediate chamber 20 is preferably a quarter to a third of the thicknesses of thinner one of the upper and lower chambers 18, 19. The above presented values of the thicknesses of the chambers 18 to 20 are values in a condition where no external load is applied to the airbag 16.

Various conditions, such as the configuration of the inflator 15 and the position of the seam 17, are determined such that the internal pressures of the chambers 18 to 20 reach specified internal pressures (internal pressures allowing the airbag 16 to function properly) within a predetermined period, which is discussed below, after the impact sensor detects an impact. Specifically, the conditions are determined such that the internal pressures of the upper and lower chambers 18, 19 reach the specified internal pressure within five to ten milliseconds, and the internal pressure of the intermediate chamber 20 reaches the specified internal pressure within seven to twelve milliseconds. If the internal pressures in the upper and lower chambers 18, 19 substantially simultaneously reach the specified pressure, the period required for the internal pressure of the intermediate chamber 20 reach the specified pressure is preferably longer than the period for the upper and lower chambers 18, 19 by about 20%. Also, if the internal pressures in the upper and lower chambers 18, 19 reach the specified pressure at different times, the period required for the internal pressure of the intermediate chamber 20 reach the specified pressure is preferably longer than the period for the longer one of the period for the upper and lower chambers 18, 19 by about 20%.

The above presented values of the internal pressures, the thicknesses, and the periods to reach the specified internal pressures of the chambers 18 to 20 are values in a condition where no external load is applied to the airbag 16, or values when the airbag 16 is statically deployed.

An operation of the side airbag apparatus 13 will now be described.

Figure 4:
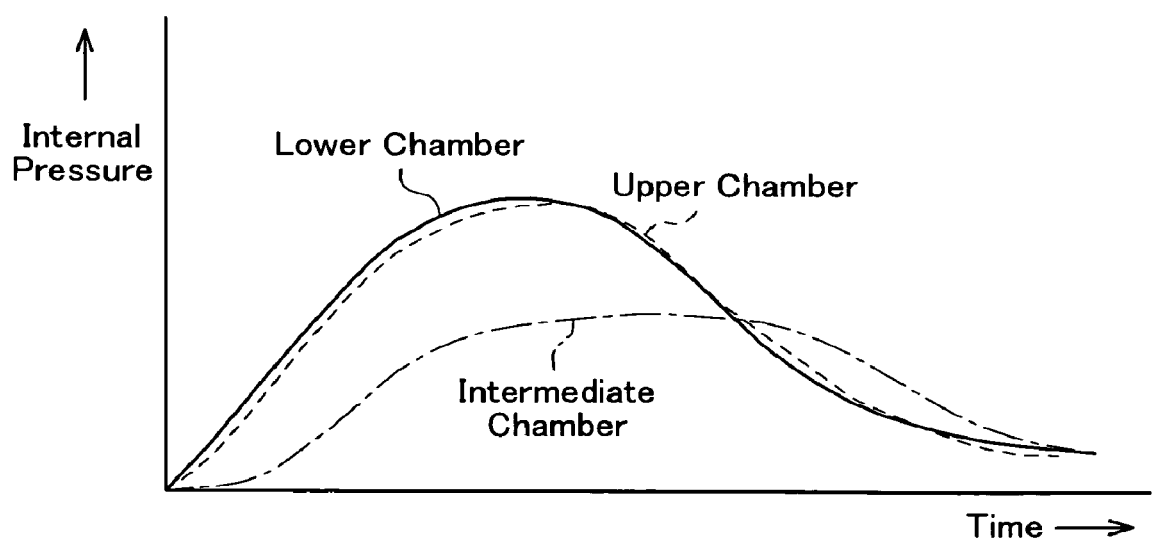
FIG. 4 is a graph showing pressure changes when the chambers of FIG. 1 are inflated.

When an impact the magnitude of which is greater than a predetermined value is applied to the body side portion due to a collision of an object, such as another vehicle, to the body side portion, the inflator 15 generates gas. The gas is then supplied to the lower chamber 19 of the airbag 16 through the gas ports 15a. The gas is also guided to the upper chamber 18 through the gas passage 21 and thereafter is guided to the intermediate chamber 20. As a result, as shown in FIG. 4, the upper chamber 18 corresponding to the shoulder Ps of the occupant and the lower chamber 19 corresponding to the lumbar region Ph of the occupant Pare substantially simultaneously inflated. Thereafter, the intermediate chamber 20 corresponding to the thorax Pc is inflated.

As shown in FIG. 2, the thickness of the inflated intermediate chamber 20 is less than those of the inflated upper and lower chambers 18, 19. Therefore, a space S is created between the thorax Pc of the occupant P and the part of the airbag 16 forming the intermediate chamber 20. In this state, the parts of the airbag 16 forming the upper and lower chambers 18, 19 push the shoulder Ps and the lumbar region Ph of the occupant P inward of the passenger compartment. The airbag 16 therefore moves the occupant P inward of the compartment and protects the thorax Pc while absorbing the impact due to a side collision. Thus, even if the body side portion significantly bulges inward, the occupant P is separated from the body side portion prior to the deformation of the body side portion, and an impact to the thorax Pc is reduced. The thorax Pc is therefore effectively protected.

This embodiment therefore has the following advantages.

(1) The airbag 16 has the upper chamber 18 corresponding to the shoulder Ps of the occupant P on the front seat 11 and the lower chamber 19 corresponding to the lumbar region Ph of the occupant P. When an impact of a magnitude greater than a predetermined value is applied to the body side portion due to a side collision, gas generated by the inflator 15 is substantially simultaneously supplied to the upper chamber 18 and the lower chamber 19. Therefore, the upper chamber 18 corresponding to the shoulder Ps of the occupant P and the lower chamber 19 corresponding to the lumbar region Ph are substantially simultaneously inflated. Thus, even if the body side portion is greatly deformed inward, the shoulder Ps and the lumbar region Ph, which are relatively impervious to impacts, are substantially simultaneously pushed by the airbag 16. This moves the occupant P inward of the passenger compartment. Accordingly, the side airbag apparatus 13 effectively protects the occupant P from impacts due to side collisions while sufficiently protecting the thorax Pc.

(2) The airbag 16 has the intermediate chamber 20 corresponding to the thorax Pc of the occupant P between the upper chamber 18 and the lower chamber 19. When the airbag 16 is deployed, bulging of the intermediate chamber 20 is limited by the seam 17 such that the thickness of the intermediate chamber 20 is less than those of the upper and lower chambers 18, 19. This prevents the thorax Pc from receiving a great impact and thus improves the protection for the occupant P.

(3) When the airbag 16 is deployed, the inflation of the upper and lower chambers 18, 19 is promoted by a greater degree than the inflation of the intermediate chamber 20, and the upper and lower chambers 18, 19 are inflated more rapidly than the intermediate chamber 20. Therefore, during a side collision, the airbag 16 first pushes the shoulder Ps and the lumbar region Ph and then protects the thorax Pc. Therefore, the thorax Pc is more effectively protected.

(4) The airbag 16 is formed of the facing pair of the fabric sheets 16a, 16b. The function to guide gas to the chambers 18 to 20, the function to limit bulging of the intermediate chamber 20, and the function to promote the inflation of the upper and lower chambers 18, 19 are realized by the seam 17, which is formed by sewing the fabric sheets 16a, 16b to each other. Therefore, there is no necessity for providing parts dedicated for these functions. This reduces the number of parts and simplifies the structure. The airbag 16 can be thus manufactured at low costs.

A second embodiment of the present invention will now be described with reference to FIGS. 5 and 6. The differences from the first embodiment shown in FIGS. 1 to 4 will mainly be discussed.

In the second embodiment, a wide seam 17A is formed in a section of the airbag 16 that is substantially center in the vertical direction. The wide seam 17A is formed by sewing the fabric sheets 16a, 16b. The wide seam 17A extends substantially horizontally to define an upper chamber 18 and a lower chamber 19 in the airbag 16. The wide seam 17A has a gas guiding function and guides gas to substantially simultaneously inflate the upper and lower chambers 18, 19. The wide seam 17A also functions to limit bulging of the intermediate portion of the airbag 16. As shown by arrows in FIG. 5, gas injected from the gas ports 15a of the inflator 15 is first guided to the lower chamber 19. The gas is then guided to the upper chamber 18 from the lower chamber 19 along the wide seam 17A via the gas passage 21. The gas is substantially simultaneously guided into the upper and lower chambers 18, 19.

When the airbag 16 is deployed, the upper chamber 18 and the lower chamber 19 are inflated at positions corresponding to the shoulder Ps and the lumbar region Ph of the occupant P, respectively. At this time, the position of the wide seam 17A between the chambers 18, 19 corresponds to the thorax Pc. In this case, since the thickness of the wide seam 17A is less than those of the chambers 18, 19 as shown in FIG. 6, a space S is created between the wide seam 17A and the thorax Pc. Therefore, as in the first embodiment, the shoulder Ps and the lumbar region Ph of the occupant P are substantially simultaneously pushed by the airbag 16, which moves the occupant P inward of the passenger compartment. Therefore, the side airbag apparatus 13 of the second embodiment effectively absorbs the impact due to a side collision while protecting the thorax Pc.

Accordingly, in addition to the advantages (1), (2) and (4) of the first embodiment, the second embodiment has the following advantage.

The function for guiding gas to the chambers 18, 19 and the function for limiting bulging of the intermediate portion of the airbag 16 are realized by the wide seam 17A, which is formed by sewing the fabric sheets 16a, 16b between the upper chamber 18 and the lower chamber 19. The wide seam 17A has a simple shape and only linearly extends. Therefore, the manufacture of the airbag 16 is simplified and the costs are reduced. When the airbag 16 is deployed, the wide seam 17A, which is significantly thinner than the chambers 18, 19, corresponds to the thorax Pc of the occupant P between the upper chamber 18 and the lower chamber 19. Therefore, the thorax Pc is effectively protected.

A third embodiment of the present invention will now be described with reference to FIG. 7. The differences from the first embodiment shown in FIGS. 1 to 4 will mainly be discussed.

In the third embodiment, as shown in FIG. 7, the airbag 16 has two seams 17, which are formed by sewing the fabric sheets 16a, 16b to each other. The seams 17 are spaced vertically by a predetermined distance. The seams 17 define an upper chamber 18, a lower chamber 19, and an intermediate chamber 20 in the airbag 16. When forming each seam 17, the fabric sheets 16a, 16b are sewed such that the intermediate sections of the fabric sheets 16a, 16b will be restrained when the airbag 16 is deployed. Thus, when the airbag 16 is deployed, the intermediate chamber 20 is thinner than the upper and lower chambers 18, 19. That is, the seams 17 function to limit bulging of the intermediate chamber 20. The thicknesses of the chambers 18 to 20 are represented by the measurements along a direction perpendicular to the surface of the sheet of FIG. 7. A cover 24 is located about the inflator 15. The cover 24 defines an introducing chamber 25 into which gas injected from the gas ports 15a of the inflator 15 is guided.

First guiding holes 26A, second guiding holes 26B, and third guiding holes 26C are formed in the cover 24 to correspond to the chambers 18, 19, and 20, respectively. The cover 24 defining the introducing chamber 25 and the guiding holes 26A to 26C formed in the cover 24 have a gas guiding function. The guiding holes 26A to 26C function to promote inflation of the upper and lower chambers 18, 19. Gas is introduced into the chambers 18, 19, 20 from the introducing chamber 25 through the corresponding guiding holes 26A to 26C, respectively. The total opening area of the first guiding hole 26A corresponding to the upper chamber 18 and the total opening area of the second guiding hole 26B corresponding to the lower chamber 19 are greater than the total opening area of the third guiding holes 26C corresponding to the intermediate chamber 20. Therefore, the upper and lower chambers 18, 19 are simultaneously inflated. Then, the intermediate chamber 20 is inflated after a delay. Further, the thickness of the intermediate chamber 20 when inflated is less than those of the upper and lower chambers 18, 19 when inflated.

Thus, the third embodiment has substantially the same advantages as the first embodiment. In this embodiment, a vent hole like the vent hole 22 shown in FIG. 1 may be provided at a portion of the airbag 16 that corresponds to the intermediate chamber 20.

A fourth embodiment of the present invention will now be described with reference to FIG. 8. The differences from the first embodiment shown in FIGS. 1 to 4 will mainly be discussed.

In the fourth embodiment, a seam 17 of an airbag 16 is substantially G-shaped as shown in FIG. 8. The seam 17 defines an upper chamber 18, a lower chamber 19, and an intermediate chamber 20 in the airbag 16. The seam 17 functions to limit bulging of the intermediate chamber 20. An inflator 15 has two gas ports 15a, which are vertically spaced. Gas is injected from the gas ports 15a at the same time. The seam 17 and the vertically spaced gas ports 15a have a gas guiding function and a function to promote inflation of the upper and lower chambers 18, 19. The seam 17 and the gas ports 15a guide gas to substantially simultaneously inflate the upper and lower chambers 18, 19, and then inflate the intermediate chamber 20.

Accordingly, in addition to the advantages of the first embodiment, the fourth embodiment has the following advantage.

The inflator 15 has the upper gas port 15a corresponding to the upper chamber 18 and the lower gas port 15a corresponding to the lower chamber 19. Therefore, the difference between the time required for inflating the upper chamber 18 and the time required for inflating the lower chamber 19 is reduced.

In this embodiment, a vent hole like the vent hole 22 shown in FIG. 1 may be provided at a portion of the airbag 16 that corresponds to the intermediate chamber 20.

Figure 9:
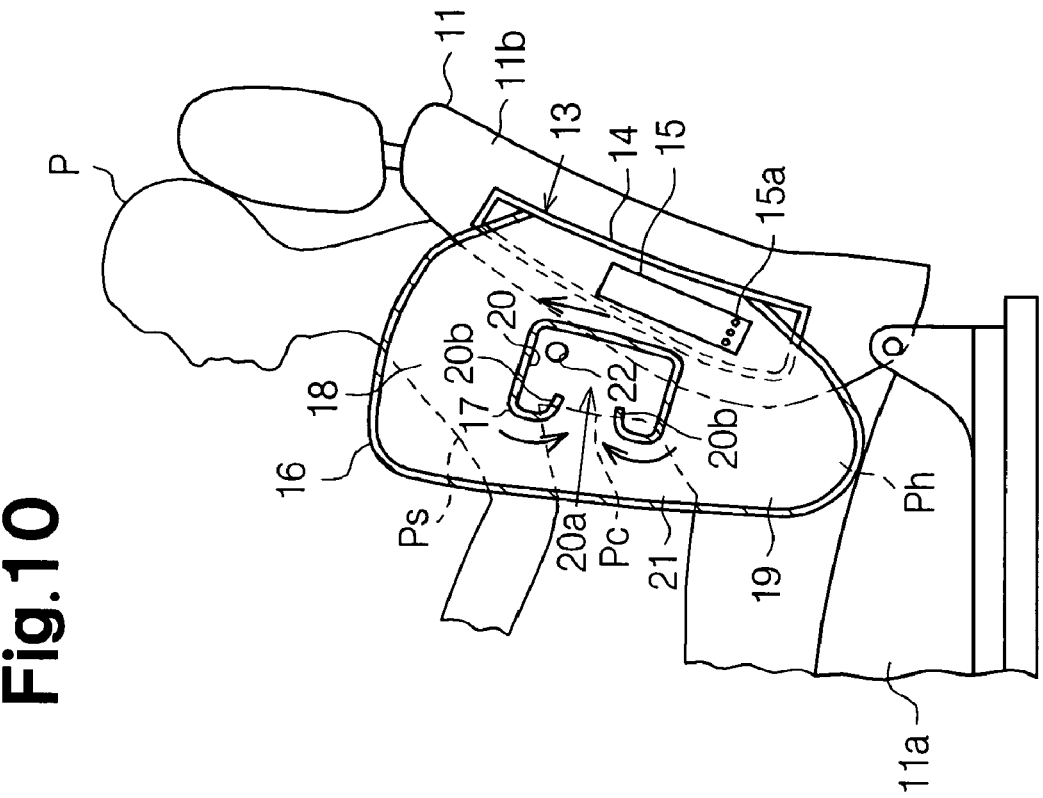
FIG. 9 is a cross-sectional view illustrating a side airbag according to a fifth embodiment of the present invention.

A fifth embodiment of the present invention will now be described with reference to FIG. 9. The differences from the first embodiment shown in FIGS. 1 to 4 will mainly be discussed.

In the fifth embodiment, an airbag 16 has an upper airbag member 16A and a lower airbag member 16B. The upper airbag member 16A has an upper chamber 18, and the lower airbag member 16B has a lower chamber 19. The airbag members 16A and 16B are independent from each other. The upper airbag member 16A corresponds to a shoulder Ps of an occupant P, and the lower airbag member 16B corresponds to a lumbar region Ph of the occupant P. The airbag members 16A, 16B are arranged vertically with a predetermined space in between in a case 14. Two inflators 15A, 15B are separately provided in the case 14 to correspond to the airbag members 16A, 16B, respectively. Each of the inflators 15A, 15B supplies gas to the corresponding one of the airbag members 16A, 16B. The separate inflators 15A, 15B have a gas guiding function, and guide gas to simultaneously inflate the airbag members 16A, 16B.

Accordingly, in addition to the advantage (1) of the first embodiment, the fifth embodiment has the following advantage.

The upper airbag member 16A having the upper chamber 18 and the lower airbag member 16B having the lower chamber 19 are independent from each other. The independent inflators 15A, 15B correspond to the different airbag members 16A, 16B, respectively. Thus, there is no need to divide the interior of a single airbag into several chambers with, for example, seams. This simplifies the structure and manufacture of the airbag 16. The upper airbag member 16A and the lower airbag member 16B are simultaneously deployed without a time difference. Further, a wide space is created at a part corresponding to the thorax Pc of an occupant P between the airbag members 16A, 16B. The thorax Pc is therefore effectively protected.

Figure 10:
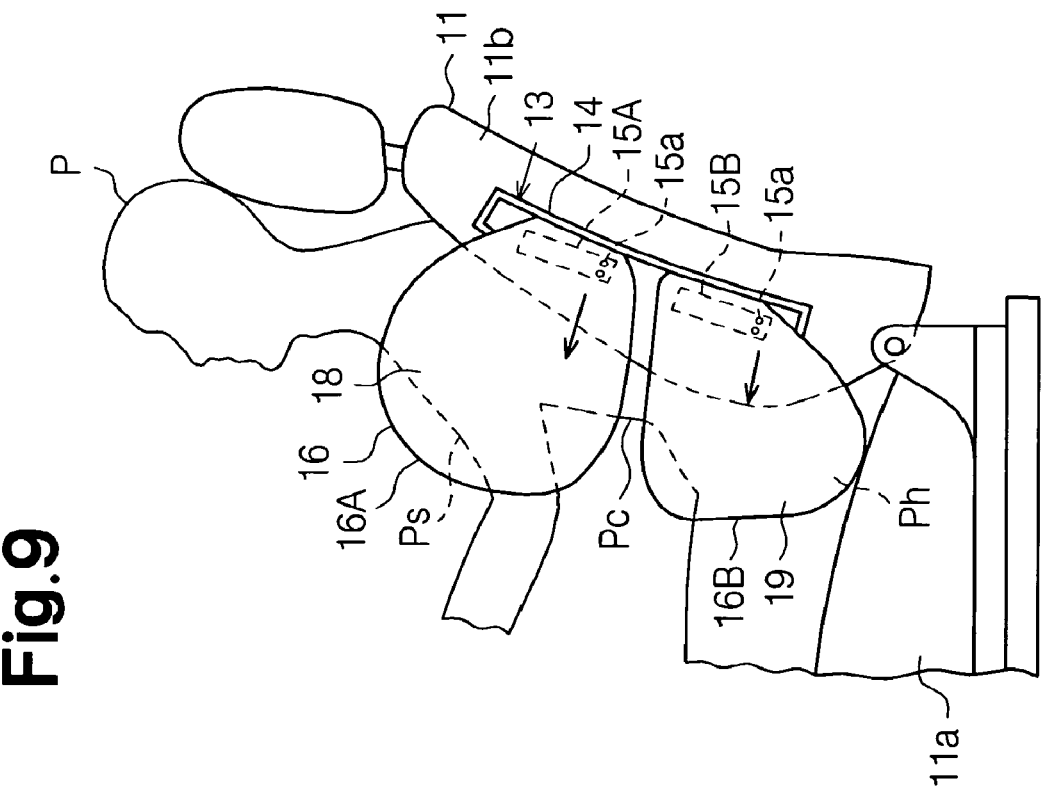
FIG. 10 is a cross-sectional view illustrating a side airbag according to a sixth embodiment of the present invention.

A sixth embodiment of the present invention will now be described with reference to FIG. 10. The differences from the first embodiment shown in FIGS. 1 to 4 will mainly be discussed.

In the sixth embodiment, a seam 17 has the same functions as that in the first embodiment. Also, an intermediate chamber 20 is defined by the seam 17. The intermediate chamber 20 has an opening 20a that opens frontward of the vehicle, or at the side opposite from an inflator 15. The seam 17 has flow guides 20b located at the upper and lower edges of the opening 20a. The flow guides 20b guide gas to the interior of the intermediate chamber 20. One of the fabric sheets 16a, 16b has a vent hole 22 at apart corresponding to the intermediate chamber 20.

Accordingly, in addition to the advantages of the first embodiment, the sixth embodiment has the following advantages.

Gas from the inflator 15 passes through the upper and lower chambers 18, 19 before entering the intermediate chamber 20. Therefore, after the upper and lower chambers 18, 19 are substantially simultaneously inflated, the intermediate chamber 20 is inflated with a little delay. Also, the internal pressure in the upper and lower chambers 18, 19 is higher than that of the intermediate chamber 20. The thorax Pc is therefore effectively protected.

The flow guides 20b smooth the flow of gas into the intermediate chamber 20. This prevents the inflation of the intermediate chamber 20 from being excessively delayed and allows the intermediate chamber 20 to be inflated at a proper timing.

Gas is readily discharged from the intermediate chamber 20 through the vent hole 22. This prevents the internal pressure of the intermediate chamber 20 from being excessively high. The thorax Pc is therefore effectively protected.

The flow guides 20b may be provided on the seam 17 of FIG. 1 or on the seam 17 of FIG. 8.

A seventh embodiment of the present invention will now be described with reference to FIGS. 11 to 14. The differences from the first embodiment shown in FIGS. 1 to 4 will mainly be discussed.

Figure 12:
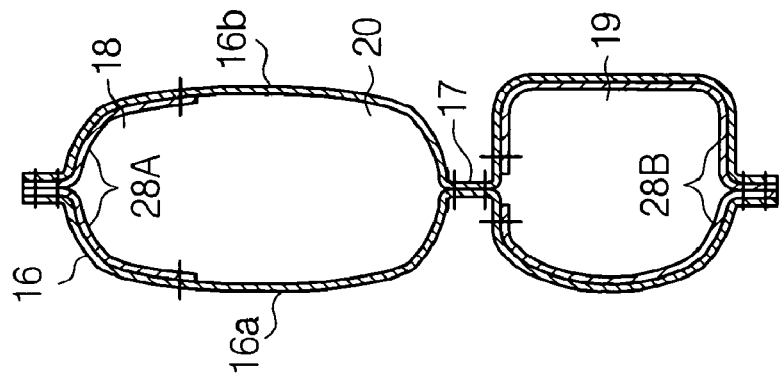
FIG. 12 is an enlarged partial cross-sectional view taken along line 12-12 of FIG. 11.
Figure 11:
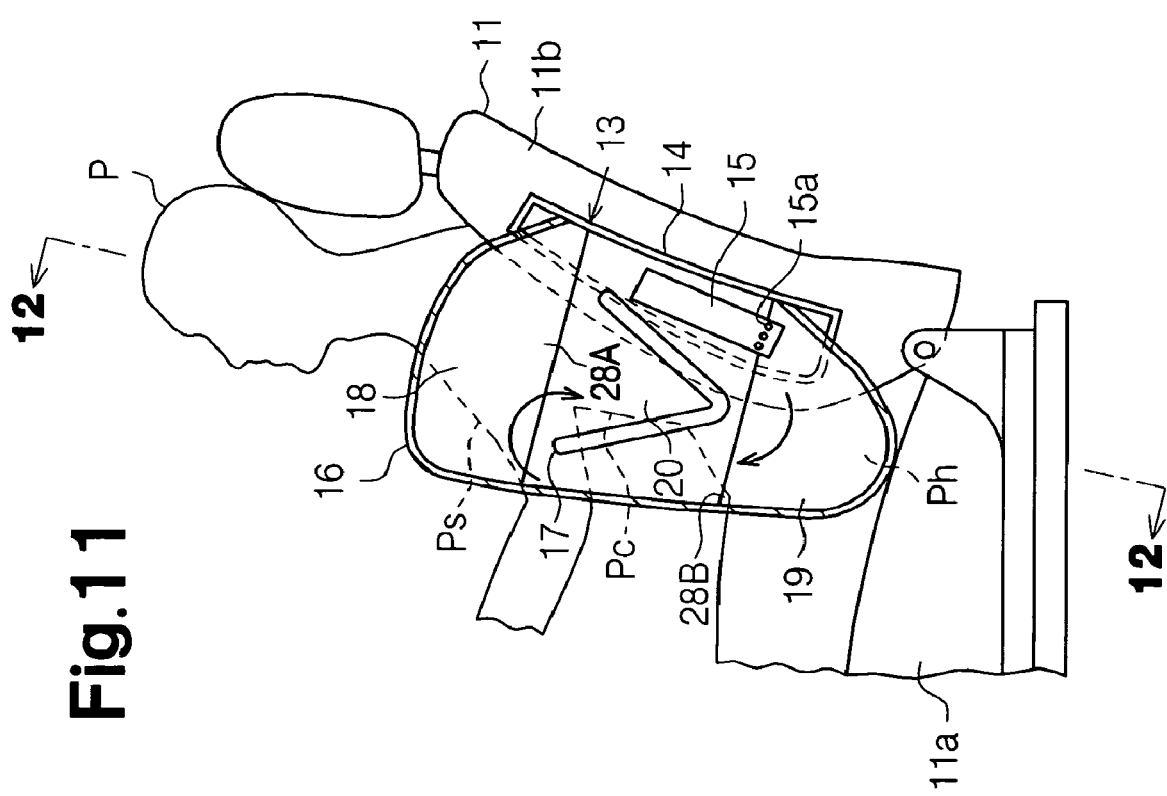
FIG. 11 is a cross-sectional view illustrating a side airbag according to a seventh embodiment of the present invention.

In the seventh embodiment, a seam 17 having a gas guiding function is substantially V-shaped as shown in FIGS. 11 and 12. The seam 17 defines an upper chamber 18, a lower chamber 19, and an intermediate chamber 20 in the airbag 16. A reinforcing fabric sheet 28A is layered on and sewed to portions of the inner sides of the fabric sheets 16a, 16b that correspond to the upper chamber 18. A reinforcing fabric sheet 28B is layered on and sewed to portions of the inner sides of the fabric sheets 16a, 16b that correspond to the lower chamber 19. The reinforcing fabric sheets 28A, 28B have internal pressure adjusting function and gas leak preventing function.

Walls that define the upper chamber 18 and the lower chamber 19 each have a double structure. When the airbag 16 is deployed, the reinforcing fabric sheets 28A, 28B prevent gas supplied to the upper and lower chambers 18, 19 from leaking. As a result, as in the case shown in FIG. 4 of the first embodiment, the internal pressure of the intermediate chamber 20 is lower than the internal pressures of the upper and lower chambers 18, 19 when the airbag 16 is deployed.

Figure 13:
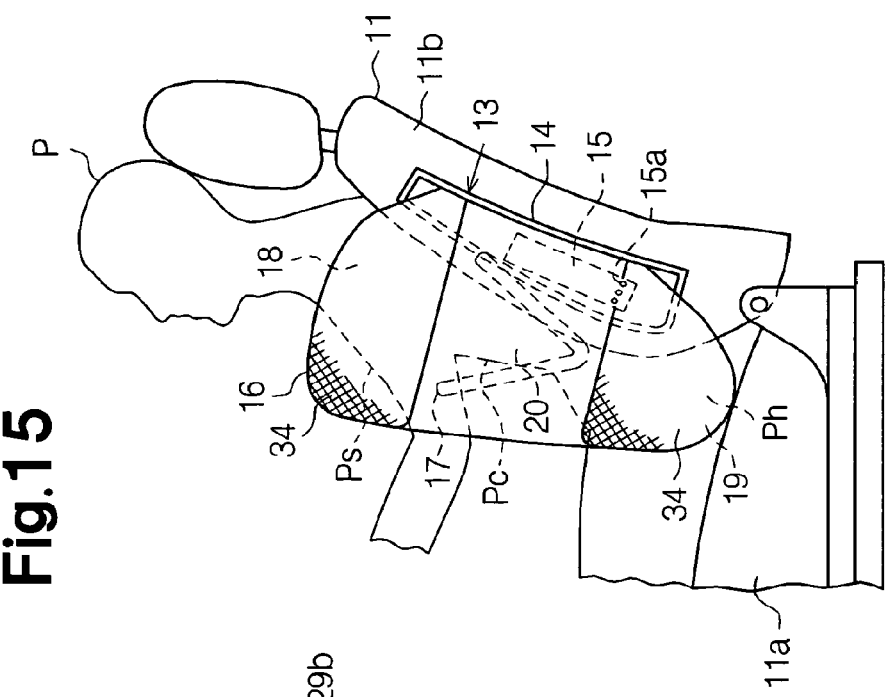
FIG. 13 is an enlarged front view illustrating the inflator provided in the side airbag apparatus shown in FIG. 11.
Figure 14:
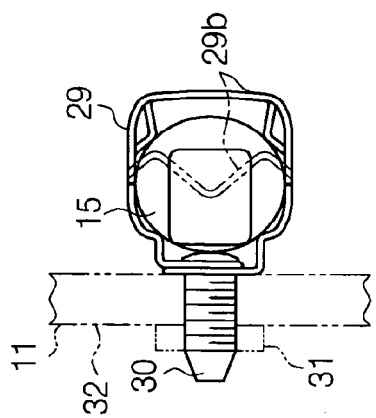
FIG. 14 is a plan view showing the inflator of FIG. 13.

In the seventh embodiment, an inflator 15 is accommodated in a cylindrical metal case 29 as shown in FIGS. 13 and 14. The cylindrical metal case 29 is fixed to a frame 32 of the front seat 11 with bolts 30 and nuts 31 at upper and lower sections. The cylindrical metal case 29 has a substantially U-shaped stopper portion 29b at an end. The stopper portion 29b is located at a side opposite from the gas ports 15a of the inflator 15. When the inflator 15 is inserted into the cylindrical metal case 29, the stopper portion 29b is bent as shown by chain two-dot lines in FIG. 14 to prevent the inflator 15 from coming off the cylindrical metal case 29.

Accordingly, in addition to the advantages of the first embodiment, the seventh embodiment has the following advantage.

With a simple structure in which the reinforcing fabric sheets 28A, 28B are provided at portions corresponding to the upper chamber 18 and the lower chamber 19, gas is prevented from leaking from the upper and lower chambers 18, 19. The prevention of gas leak sets the internal pressure of the intermediate chamber 20 corresponding to the thorax Pc of the occupant P lower than the internal pressures of the upper and lower chambers 18, 19. The thorax Pc is therefore effectively protected.

Instead of the reinforcing fabric sheets 28A, 28B, the parts of the fabric sheets 16a, 16b that correspond to the upper and lower chambers 18, 19 may be formed with a material having a less gas leakage characteristics than the material for the part corresponding to the intermediate chamber 20.

Figure 15:
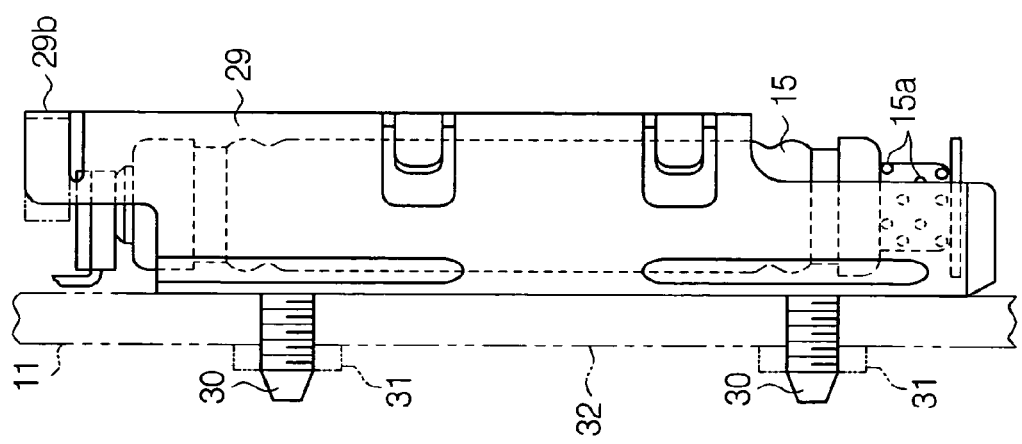
FIG. 15 is a cross-sectional view illustrating a side airbag apparatus according to an eighth embodiment of the present invention.

An eighth embodiment of the present invention will now be described with reference to FIG. 15. The differences from the seventh embodiment shown in FIGS. 11 to 14 will mainly be discussed.

In the eighth embodiment, the reinforcing fabric sheets 28A, 28B of the seventh embodiment are omitted. Instead, a coating layer 34 is formed on at least one of the surfaces of the fabric sheets 16a, 16b at a portion corresponding to the upper chamber 18. A coating layer 34 is formed on at least one of the surfaces of the fabric sheets 16a, 16b at a portion corresponding to the lower chamber 19. The coating layers 34 are made, for example, of silicone rubber. Each coating layer 34 prevents gas from leaking from the corresponding chambers 18, 19. That is, in this embodiment, the coating layers 34 having an internal adjusting function and a leak prevention function are provided instead of the reinforcing fabric sheets 28A, 28B.

Therefore, the simple structure of the coating layers 34 sets the internal pressure of the intermediate chamber 20 lower than those of the upper and lower chambers 18, 19. Thus, as in the seventh embodiment, the thorax Pc is effectively protected with the simply structured airbag 16.

A ninth embodiment of the present invention will now be described with reference to FIGS. 16 and 17. The differences from the seventh embodiment shown in FIGS. 11 to 14 will mainly be discussed.

In the ninth embodiment, the airbag 16 has a vent hole 22 in addition to the structure of the seventh embodiment. As shown in FIGS. 16 and 17, the vent hole 22 opens to the outside and is located at a part that corresponds to the intermediate chamber 20. Specifically, the vent hole 22 corresponds to a part where gas from the inflator 15 reaches last. The reinforcing fabric sheets 28A, 28B shown in FIGS. 16 and 17 may be omitted. When the airbag 16 is deployed, the vent hole 22 is spaced from the inner side of the door 12 forming the body side portion by a predetermined distance L. The distance L is determined such that the vent hole 22 is sufficiently separated from the inner side of the door 12 when the airbag 16 is deployed. The vent hole 22 has an internal pressure adjusting function. That is, when the airbag 16 is deployed, the vent hole 22 discharges gas from the intermediate chamber 20 to the outside so that the internal pressure of the intermediate chamber 20 is lower than those of the upper and lower chambers 18, 19.

Therefore, the ninth embodiment has the same advantages as the seventh and eighth embodiments. Also, since the vent hole 22 is spaced from the inner side of the door 12 when the airbag 16 is deployed, the vent hole 22 is not closed by the door 12. Accordingly, the internal pressure of the intermediate chamber 20 is effectively lowered.

Figure 18:
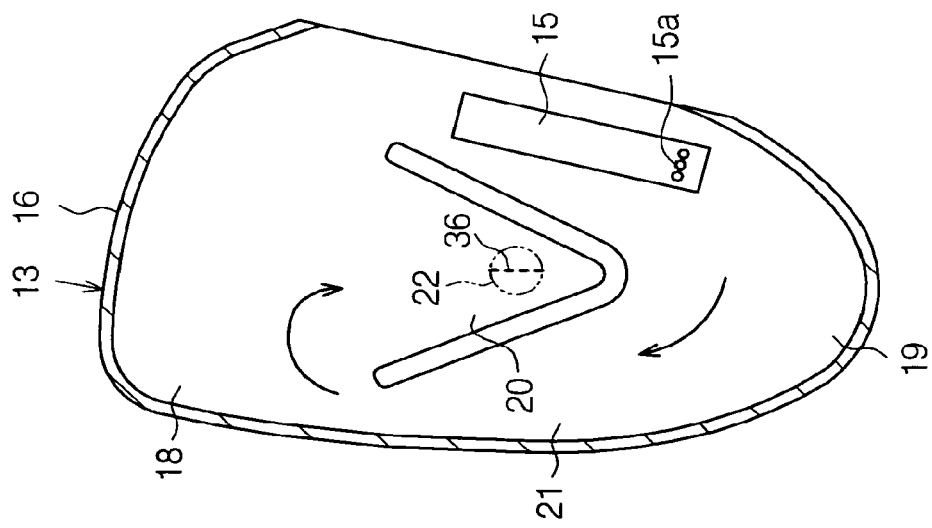
FIG. 18 is a cross-sectional view illustrating a modification of the side airbag apparatus according to the ninth embodiment.

In lieu of the vent hole 22 of the ninth embodiment, a perforation 36 may be formed at apart corresponding to the intermediate chamber 20 of the airbag 16 as shown in FIG. 18. When the internal pressure of the intermediate chamber 20 reaches a predetermined value, the perforation 36 breaks to form a vent hole 22. In this case, the amount of gas discharged through the vent hole 22 is changed in accordance with the internal pressure of the intermediate chamber 20. The internal pressure of the intermediate chamber 20 is therefore appropriately controlled. In the subsequent embodiments also, the vent hole 22 may be changed to a perforation as the perforation 36 shown in FIG. 18.

A tenth embodiment of the present invention will now be described with reference to FIGS. 19 and 20. The differences from the first embodiment shown in FIGS. 1 to 4 will mainly be discussed.

Figure 20:
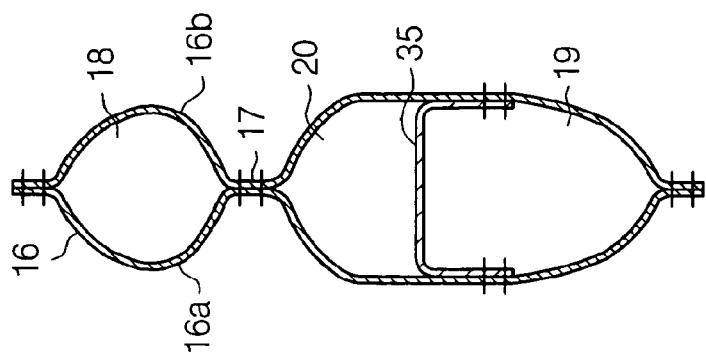
FIG. 20 is an enlarged partial cross-sectional view taken along line 20-20 of FIG. 19.
Figure 19:
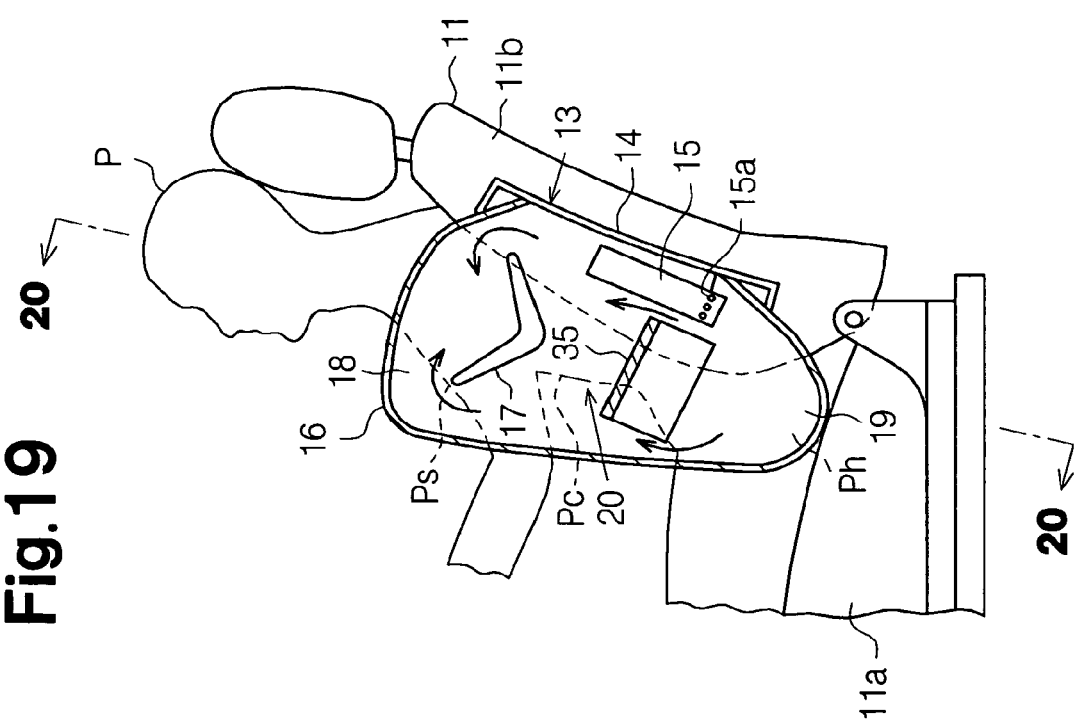
FIG. 19 is a cross-sectional view illustrating a side airbag apparatus according to a tenth embodiment of the present invention.

In the tenth embodiment, as shown in FIGS. 19 and 20, the airbag 16 has a V-shaped seam 17. A bag-like flow adjuster fabric sheet 35 is sewed to the inside of the airbag 16 below the V-shaped seam 17. The flow adjuster fabric sheet 35 opens downward. An upper chamber 18 that corresponds to a shoulder Ps of an occupant P is defined above the seam 17. A lower chamber 19 that corresponds to the lumbar region Ph of the occupant P is defined below the flow adjuster fabric sheet 35. An intermediate chamber 20 is defined between the flow adjuster fabric sheet 35 and the seam 17. The intermediate chamber 20 corresponds to the thorax Pc of the occupant P. The flow adjuster fabric sheet 35 has an internal pressure adjusting function. When the airbag 16 is deployed, the flow adjuster fabric sheet 35 adjusts the internal pressure in the intermediate chamber 20 to be lower than the internal pressure of the lower chamber 19.

Therefore, the tenth embodiment has substantially the same advantages as the seventh to ninth embodiments. In this embodiment, a vent hole like the vent hole 22 shown in FIG. 1 or a perforation like the perforation 36 shown in FIG. 18 may be provided at a portion of the airbag 16 that corresponds to the intermediate chamber 20.

An eleventh embodiment of the present invention will now be described with reference to FIGS. 21 and 22. The differences from the first embodiment of FIGS. 1 to 4 will mainly be discussed.

Figure 22:
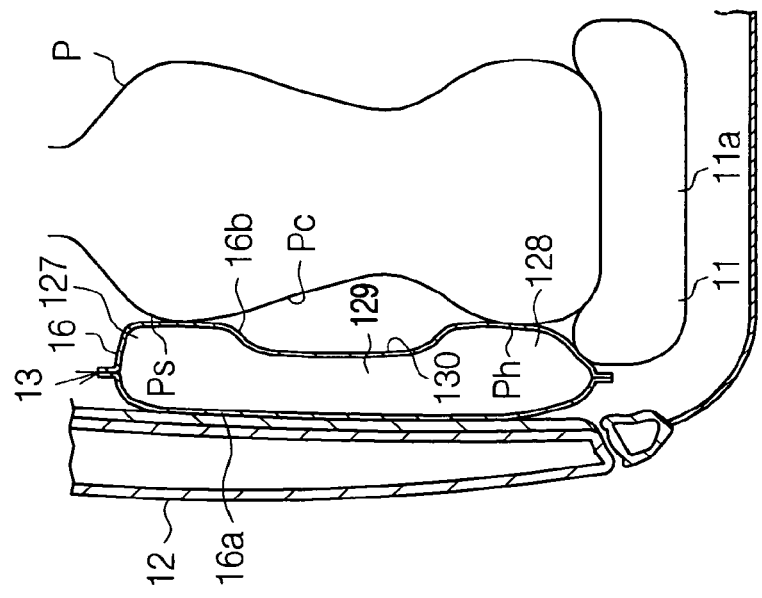
FIG. 22 is an enlarged partial cross-sectional view taken along line 22-22 of FIG. 21.
Figure 21:
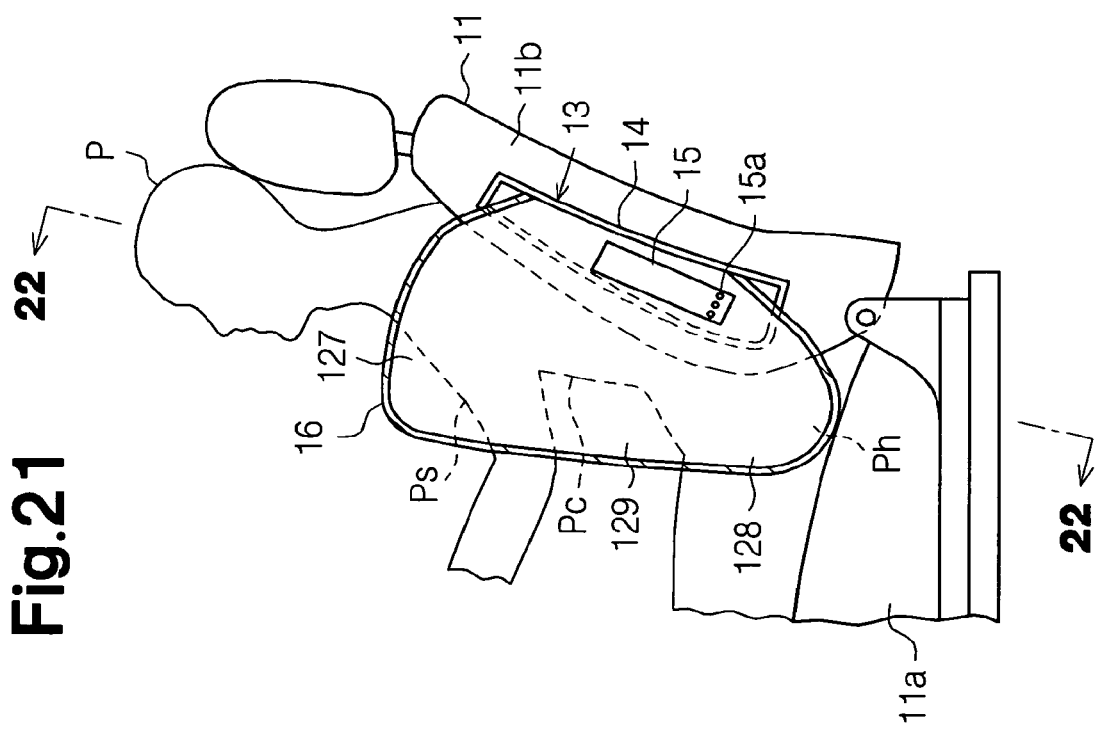
FIG. 21 is a cross-sectional view illustrating a side airbag apparatus according to an eleventh embodiment of the present invention.

In the eleventh embodiment, as shown in FIGS. 21 and 22, the interior of the airbag 16 is not divided. That is, a single chamber is defined in the airbag 16. When the airbag 16 is deployed, the airbag 16 has an upper deployment portion 127 corresponding to a shoulder Ps of an occupant P, a lower deployment portion 128 corresponding to a lumbar region Ph of the occupant P, and an intermediate deployment portion 129 corresponding to the thorax Pc of the occupant P.

A constricted portion 130 is formed in the intermediate deployment portion 129 at a side in the direction of thickness. The constricted portion 130 corresponds to the thorax Pc of the occupant P. The constricted portion 130 limits bulging of the intermediate deployment portion 129. Therefore, as shown in FIG. 22, the thickness of the intermediate deployment portion 129 is less than those of the upper and lower deployment portions 127, 128. As shown in FIG. 21, the width (lateral measurement as viewed in FIG. 21) of the upper deployment portion 127 is greater than those of the lower and intermediate deployment portions 128, 129. The constricted portion 130 is formed, for example, by using wefts having a small stretchability for the portion corresponding to the intermediate deployment portion 129 of the fabric sheet 16b at the side of the occupant P. That is, the wefts with a small stretchability function to limit bulging of the intermediate deployment portion 129.

When the airbag 16 is deployed, bulging of the intermediate deployment portion 129 is limited by the constricted portion 130 as shown in FIG. 22. The thickness of the upper deployment portion 127 and the lower deployment portion 128 is greater than that of the intermediate deployment portion 129. At the same time, as shown in FIG. 21, the upper deployment portion 127 is wider than the lower deployment portion 128 and the intermediate deployment portion 129. Thus, the shoulder Ps and the lumbar region Ph of the occupant P are substantially simultaneously pushed at two points by the airbag 16. This presses the occupant P inwardly. Accordingly, the airbag 16 reduces the impact due to a side collision while protecting the thorax Pc.

Accordingly, in addition to the advantage (2) of the first embodiment, the eleventh embodiment has the following advantages.

Bulging of the intermediate portion 129 is limited simply by forming the constricted portion 130 at the side of the intermediate deployment portion 129 of the airbag 16. Therefore, there is no necessity for providing parts dedicated for limiting the bulging of the intermediate deployment portion 129. This reduces the number of parts and simplifies the structure. The airbag 16 can be thus manufactured at low costs.

The width of the upper deployment portion 127 is greater than those of the lower and intermediate deployment portion 128, 129. Therefore, when the airbag 16 is deployed, the wide upper deployment portion 127 effectively contacts the shoulder Ps of the occupant P, which readily moves the occupant P inward of the passenger compartment.

A twelfth embodiment of the present invention will now be described with reference to FIG. 23. The differences from the first embodiment shown in FIGS. 1 to 4 will mainly be discussed.

In the twelfth embodiment, as shown in FIG. 23, the airbag 16 has two seams 17A, 17B, which are formed by sewing the fabric sheets 16a, 16b to each other. The seams 17A, 17B are located at an intermediate section in the vertical direction of the airbag 16. The seams 17A, 17B extend vertically and are spaced from each other in the width direction (lateral direction as viewed in FIG. 23) of the airbag 16. The seams 17A, 17B define an upper chamber 18, a lower chamber 19, and an intermediate chamber 20 in the airbag 16. That is, the upper chamber 18 is defined above the seams 17A, 17B. The lower chamber 19 is defined below the seams 17A, 17B. The intermediate chamber 20 is defined between the seams 17A and 17B. The first seam 17A, which is closer to the inflator 15, is vertically longer than the second seam 17B, which is farther from the inflator 15. The first seam 17A has a function to promote the inflation of the upper and lower chambers 18, 19 in the vertical direction, or a function to delay the inflation of the intermediate chamber 20. The first seam 17A also has a function to simultaneously guide gas to the upper and lower chambers 18, 19.

The inflator 15 has upper gas ports 15a and lower gas ports 15a at an upper portion and a lower portion of the inflator 15, respectively. Gas is injected from the upper and lower gas ports 15a at the same time. Gas injected from the upper gas ports 15a is guided to the upper chamber 18 along the first seam 17A and then supplied to the intermediate chamber 20. On the other hand, gas injected from the lower gas ports 15a is guided to the lower chamber 19 along the first seam 17A and then supplied to the intermediate chamber 20. Therefore, after the upper and lower chambers 18, 19 are simultaneously inflated, the intermediate chamber 20 is inflated after a delay.

Thus, the twelfth embodiment has substantially the same advantages as the first embodiment.

A thirteen embodiment of the present invention will now be described with reference to FIG. 24. The differences from the first embodiment shown in FIGS. 1 to 4 will mainly be discussed.

In the thirteenth embodiment, a fastener fabric sheet 229 made of flame-resistant nonwoven fabric is wrapped about the folded airbag 16 (see the solid lines) as shown in FIG. 24. The fastener fabric sheet 229 has a function to promote the inflation of the upper and lower chambers 18, 19 in the vertical direction, or a function to delay the inflation of the intermediate chamber 20. A perforation 230 is formed at apart of the fastener fabric sheet 229 at a position opposite from the inflator 15. The perforation 230 breaks when the airbag 16 is deployed. In this embodiment, the seam 17 shown in FIG. 1 may be either provided or omitted.

When gas is supplied from the inflator 15 to the interior of the airbag 16, the upper and lower chambers 18, 19 are inflated as shown by chain double-dashed lines in FIG. 24 with the intermediate portion of the airbag 16 tied with fastener fabric sheet 229. Thereafter, due to an increase of the internal pressure of the airbag 16, the fastener fabric sheet 229 is torn along the perforation 230, which releases the intermediate portion of the airbag 16. Then, as shown by chain two-dashed lines in FIG. 24, the intermediate chamber 20 is inflated after a little delay.

Accordingly, in addition to the advantages of the first embodiment, the thirteenth embodiment has the following advantage.

The inflation of the upper and lower chambers 18, 19 are promoted simply providing the fastener fabric sheet 229 about the intermediate portion of the airbag 16. Therefore, the inflation of the upper and lower chambers 18, 19 is readily improved while minimizing the increase in the number of parts and complication of the structure. In other words, the inflation of the intermediate chamber 20 is reliably delayed.

A fourteenth embodiment of the present invention will now be described with reference to FIGS. 25 to 29(b). The differences from the first embodiment shown in FIGS. 1 to 4 will mainly be discussed.

Figure 26:
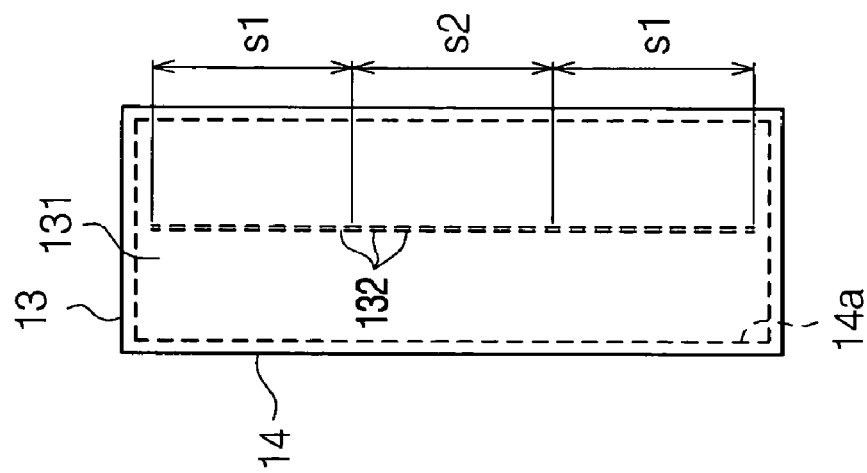
FIG. 26 is a front view showing the side airbag apparatus shown in FIG. 25.
Figure 25:
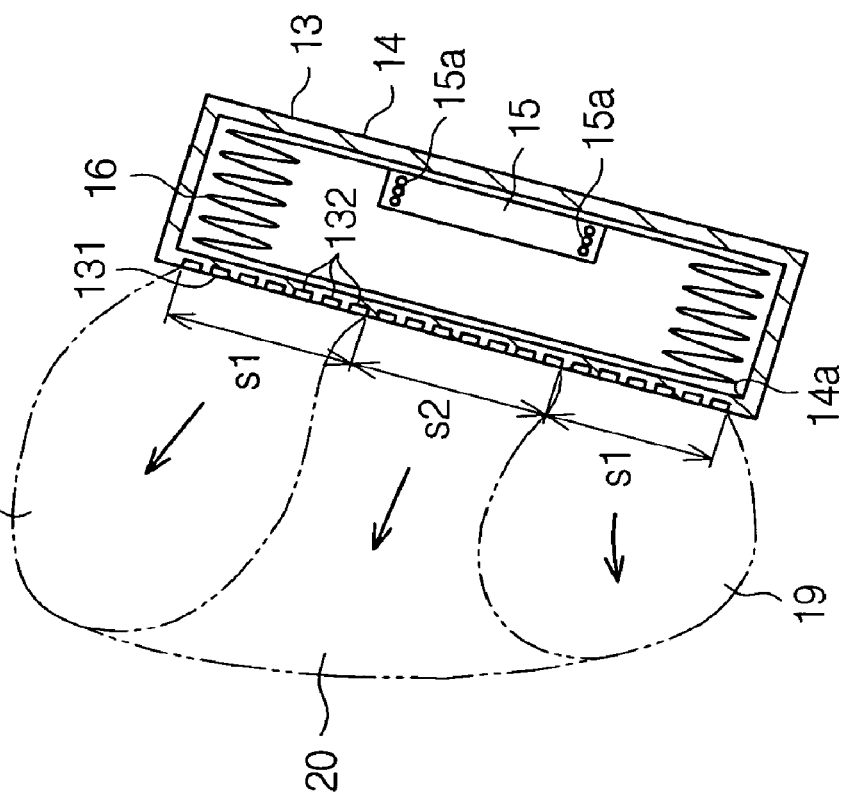
FIG. 25 is a cross-sectional view illustrating a side airbag apparatus according to a fourteenth embodiment of the present invention.

In the fourteenth embodiment, a case 14 for accommodating the folded airbag 16 has a breakable cover 131 as shown in FIGS. 25 and 26. The breakable cover 131 is located at a side opposite from the inflator 15. In other words, the case 14 has an opening 14a for projecting the airbag 16 and the breakable cover 131 covering the opening 14a. A vertically extending set of perforations 132 is formed in the lateral center of the breakable cover 131. The breaking strength of the perforations 132 is weaker in first portions s1 corresponding to the upper and lower chambers 18, 19 of the airbag 16 than in a second portion s2 corresponding to the intermediate chamber 20. The perforations 132 have a function to promote the inflation of the upper and lower chambers 18, 19 in the vertical direction, or a function to delay the inflation of the intermediate chamber 20. In this embodiment, the seam 17 shown in FIG. 1 may be either provided or omitted.

To differentiate the breaking strength of the perforations 132 between the first portions s1 and the second portion s2, the cover 131 may be configured as follows. In an example shown in FIGS. 27(a) and 27(b), a pitch p1 of the perforations 132 in the first portions s1 is smaller than a pitch p2 in the second portion s2. In an example shown in FIGS. 28(a) and 28(b), a width w1 of the perforations 132 in the first portions s1 is wider than a width w2 in the second portion s2. In an example shown in FIGS. 29(a) and 29(b), a depth d1 of recesses 132g at the first portions s1 is greater than a corresponding depth d2 in the second portion s2.

When gas is supplied to the airbag 16 from the inflator 15, the inflating pressure of the airbag 16 first breaks the breakable cover 131 at a part corresponding to the first portions s1 along the perforations 132. Then, as shown by chain double-dashed lines in FIG. 25, the upper and lower chambers 18, 19 are inflated outward of the case 14. Thereafter, the part corresponding to the second portion s2 of the breakable cover 131 is torn along the perforations 132. As shown by chain double-dashed line in FIG. 25, the intermediate chamber 20 is inflated after a delay.

Accordingly, in addition to the advantages of the first embodiment, the fourteenth embodiment has the following advantage.

The inflation of the upper and lower chambers 18, 19 is readily improved simply by forming the perforations 132 with varied breaking strength in the breakable cover 131 of the case 14 accommodating the airbag 16. In other words, the inflation of the intermediate chamber 20 is reliably delayed. Therefore, the increase in the number of parts and the complication of the structure are minimized.

To differentiate the breaking strength of the perforations 132 between the first portions s1 and the second portion s2, the length of each hole in the first portion s1 may be greater than that in the second portion s2. Alternatively, to differentiate the breaking strengths of the first portions s1 and the second portion s2 from each other, two or more elements of the pitch, the width, the depth, and the hole length may be varied.

A fifteenth embodiment of the present invention will now be described with reference to FIGS. 30 to 32(b). The differences from the fourteenth embodiment shown in FIGS. 25 to 29(b) will mainly be discussed.

Figure 31:
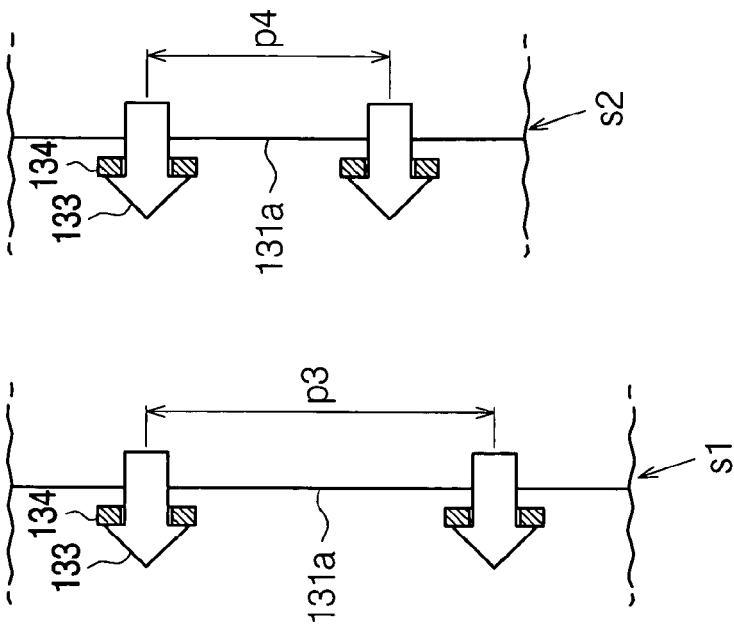
FIG. 31 is an enlarged partial cross-sectional view taken along line 31-31 of FIG. 30.
Figure 30:
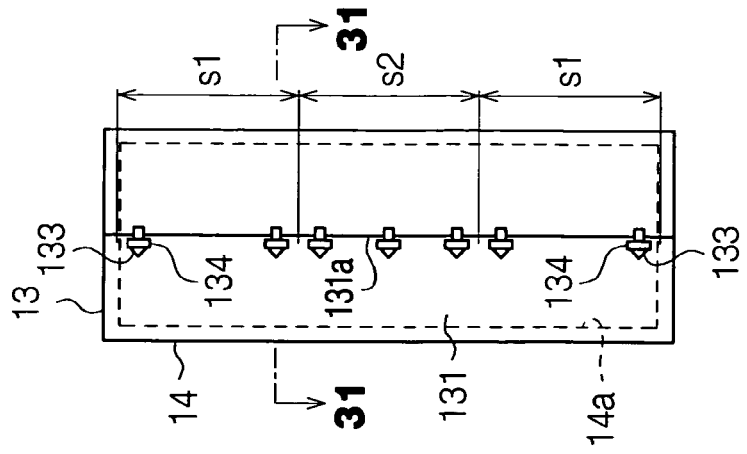
FIG. 30 is a cross-sectional view illustrating a side airbag apparatus according to a fifteenth embodiment of the present invention.

In the fifteenth embodiment, the breakable cover 131 of the case 14 has a vertically extended slit 131a instead of the perforations 132 as shown in FIGS. 30 and 31. The breakable cover 131 is divided into a pair of pieces by the vertically extended slit 131a. Hooks 133 are arranged on one of the pieces. Eyes 134 are arranged on the other one of the pieces. Each eye 134 corresponds to one of the hooks 133. Each hook 133 is engaged with the corresponding eye 134. The opening 14a is closed by engaging the hooks 133 with the eyes 134 with the folded airbag 16 accommodated in the case 14. The hooks 133 and the eyes 134 have a function to maintain the opening 14a closed with the breakable cover 131. The hooks 133 and the eyes 134 have a function to promote the inflation of the upper and lower chambers 18, 19 in the vertical direction, or a function to delay the inflation of the intermediate chamber 20.

Figures 32A, 32B:
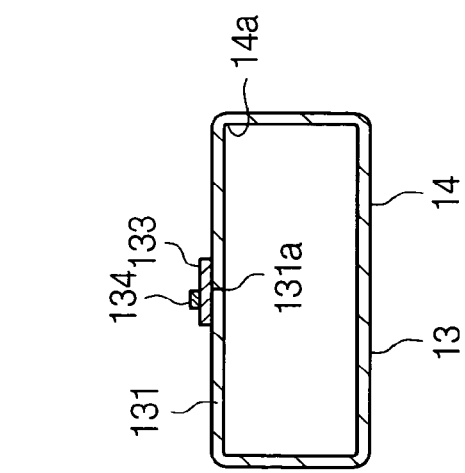
FIGS. 32(a) and 32(b) are enlarged partial cross-sectional views showing the arrangement of pairs of engaging hook and engaging eyes.

When gas is supplied to the airbag 16 from the inflator 15, the inflating pressure of the airbag 16 disengages the hooks 133 from the eyes 134. Accordingly, the breakable cover 131 opens the opening 14a at the vertically extended slit 131a. As shown in FIG. 32(a), a pitch of the hooks 133 and the eyes 134 is represented by p3 at the first portions s1 that corresponds to the upper and the lower chambers 18, 19. As shown in FIG. 32(b), a pitch of the hooks 133 and the eyes 134 is represented by p4 at a second portion s2 that corresponds to the intermediate chamber 20. In this embodiment, the pitch p3 at the first portion s1 is greater than the pitch p4 at the second portion s2. Therefore, the force required for opening the opening 14a against the engaging force of the hooks 133 and the eyes 134 (opening strength) is weaker in the first portions s1 than in the second portion s2.

When gas is supplied to the airbag 16 from the inflator 15, the inflating pressure of the airbag 16 first disengages the hooks 133 from the eyes 134 in the first portions s1. Accordingly, the upper and lower chambers 18, 19 are inflated outward of the case 14. Thereafter, the hooks 133 and the eyes 134 are disengaged from each other in the second portion s2, which inflates the intermediate chamber 20 after a delay.

Therefore, according to the fifteenth embodiment, the inflation of the upper and lower chambers 18, 19 is readily promoted simply by forming the hooks 133 and the eyes 134 at varying pitch in the breakable cover 131 of the case 14 accommodating the airbag 16. In other words, the inflation of the intermediate chamber 20 is reliably delayed. This embodiment therefore has the same advantages as the fourteenth embodiment.

A sixteenth embodiment of the present invention will now be described with reference to FIG. 33. The differences from the first embodiment shown in FIGS. 1 to 4 will mainly be discussed.

Figure 33:
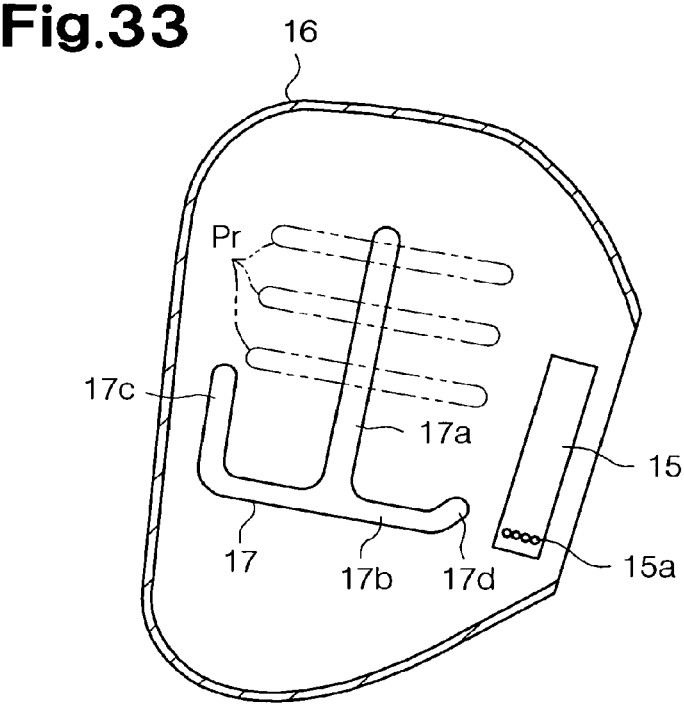
FIG. 33 is a cross-sectional view illustrating a side airbag apparatus according to a sixteenth embodiment of the present invention.
Figure 34:
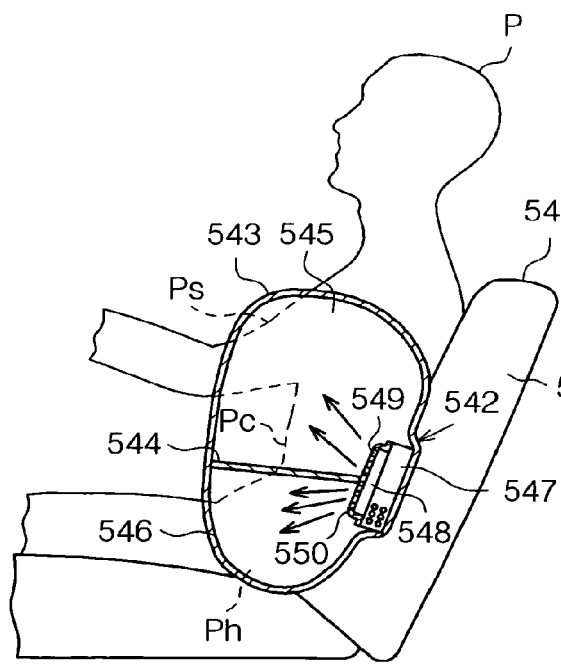
FIG. 34 is a cross-sectional view illustrating a first prior art side airbag apparatus.
Figure 35:
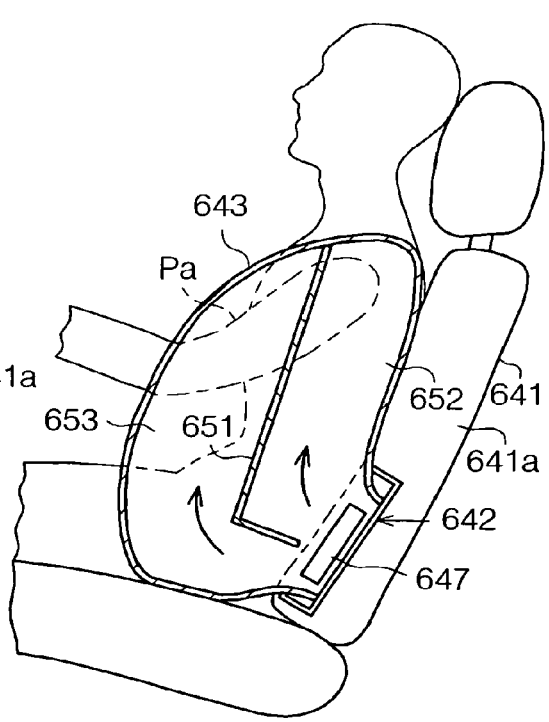
FIG. 35 is a cross-sectional view illustrating a second prior art side airbag apparatus.

In the sixteenth embodiment, a seam 17 of an airbag 16 is formed to be T-shaped as shown in FIG. 33. The seam 17 has a vertical seam portion 17a and a lateral seam portion 17b. When the airbag 16 is deployed, the vertical seam portion 17a extends vertically at a center of the airbag 16 in a vehicle moving direction (lateral direction as viewed in FIG. 33). The lateral seam portion 17b is connected to the lower end of the vertical seam portion 17a and extends laterally. A front guiding seam portion 17c is provided at the front end of the lateral seam portion 17b. A rear guiding seam portion 17d is provided at the rear end of the lateral seam portion 17b. The front guiding seam portion 17c is spaced from the front edge of the airbag 16 by a predetermined distance and extends substantially parallel to the front edge of the airbag 16. The rear guiding seam portion 17d is located at a position corresponding to the gas ports 15a of the inflator 15 and extends in a slanted manner to guide gas injected from the gas ports 15a to a part below the lateral seam portion 17b.

When the airbag 16 is deployed, the vertical seam 17a extends perpendicular to the direction in which the ribs Pr of the occupant P extend. That is, the vertical seam portion 17a is an intersecting portion that intersects the ribs Pr of the occupant P. The seam 17 partially limits the inflation of the central portion of the airbag 16 such that the area of the airbag 16 contacting the occupant P is less in the flank of the occupant than in the shoulder Ps and the lumbar region Ph. The flank refers to a part including the thorax Pc and the abdomen. In FIG. 33, the ribs Pr of the occupant P are schematically shown. A vent hole (not shown) is formed in a part of the airbag 16 to discharge gas from the interior.

When the airbag 16 is deployed, the seam 17 partially limits the inflation of the airbag 16. As a result, the degree of inflation of the part of the airbag 16 that corresponds to the flank of the occupant P is less than the degree of inflation of the part of the airbag 16 that corresponds to the shoulder Ps and the lumbar region Ph. The difference in the inflation degrees causes the area of the airbag 16 contacting the flank to be less than the area of the airbag 16 contacting the shoulder Ps and the lumbar region Ph. Therefore, even if the internal pressure of the airbag 16 is uniform, the reaction force of the airbag 16 applied to the flank is reduced where the contacting area of the airbag 16 is small. Therefore, constraining force applied to the flank is less than constraining force applied to the shoulder Ps and the lumbar region Ph. That is, although the impact on the flank is reduced, the shoulder Ps and the lumbar region Ph are sufficiently constrained by the airbag 16. As a result, the entire body of the occupant P including the flank is effectively protected.

When the airbag 16 is deployed, the vertical seam portion 17a intersects with the ribs Pr of the occupant P. Therefore, the contacting area of the airbag 16 is reduced over all the ribs Pr, or over the entire flank. The occupant is thus effectively protected. If the vertical seam portion 17a is narrow and parallel to the ribs Pr, the contacting area of the airbag 16 is reduced only at one of the ribs Pr that corresponds to the vertical seam portion 17a. In this case, the contacting area of the airbag 16 of parts that do not correspond to the vertical seam portion 17a is not reduced.

The seam 17 has the vertical seam portion 17a extending vertically and the lateral seam portion 17b extending laterally. The vertical seam portion 17a and the lateral seam portion 17b cooperate to effectively limit the inflation of a part of the airbag 16 corresponding to the flank in a wide region. The lateral seam portion 17b guides the flow of gas to quickly deploy the airbag 16 despite the vertical seam portion 17a. The guiding seam portions 17c, 17d at the ends of the lateral seam portion 17b smoothly guide gas from the gas ports 15a at the lower portion of the inflator 15 to the upper portion of the airbag 16 through the section below the lateral seam portion 17b, thereby rapidly deploying the airbag 16.

The operation and the advantages of this embodiment are realized in some of the preceding embodiments, for example, in the side airbag apparatus having the V-shaped seam 17 shown in FIG. 11.

The above described embodiments may be modified as follows.

To make the internal pressure of the intermediate chamber 20 lower than those of the upper and lower chambers 18, 19, the cross-sectional area of the gas passage from the inflator 15 to the intermediate chamber 20 may be restricted.

Instead for forming the airbag by sewing the fabric sheets 16a, 16b, the airbag may be formed with a single hollow weave.

Instead of woven cloth, the airbag may be formed with other materials, such as nonwoven fabric or synthetic resin sheets.

Therefore, the present examples and embodiments are to be considered as illustrative and not restrictive and the invention is not to be limited to the details given herein, but may be modified within the scope and equivalence of the appended claims.

The invention claimed is:

1. A side airbag apparatus used in a vehicle, comprising:
a single airbag accommodated in a backrest of a seat located in a passenger compartment of the vehicle in a folded state;
an inflator, wherein the inflator supplies gas to the airbag, thereby deploying the airbag between a body side portion of the vehicle and the seat, wherein
the airbag is configured to include an upper portion, a lower portion, and an intermediate portion provided in the airbag and respectively opposed to a shoulder, a lumbar region and a thorax of an occupant sitting on the seat in a lateral direction of the vehicle when the airbag is deployed, wherein the upper, lower and intermediate portions are configured as structurally separate portions along at least an occupant impact side of the airbag, and have respective deployed thickness dimensions in a horizontal direction between the occupant and the body side portion, wherein a portion of the upper portion that has a maximum deployed thickness is located at a position that corresponds to the shoulder, a portion of the lower portion that has a maximum deployed thickness is located at a position that corresponds to the lumbar region, and the intermediate portion is located at a position that corresponds to the thorax and extends from a front end to a rear end of the airbag, and wherein, over the entire area of the airbag, in a front and rear direction of the vehicle, the deployed thickness of the intermediate portion is less than the maximum deployed thickness of the upper and lower portions.

2. The side airbag apparatus according to claim 1, further comprising a gas guiding mechanism, wherein the gas guiding mechanism guides gas from the inflator to the upper and lower portions, thereby substantially simultaneously inflating the upper and lower portions.

3. The side airbag apparatus according to claim 2, wherein the gas guiding mechanism includes a seam that is formed by facing portions of the airbag being partially sewn to each other.

4. The side airbag apparatus according to claim 3, wherein the seam defines the upper portion and the lower portion in the interior of the airbag.

5. The side airbag apparatus according to claim 2, wherein the gas guiding mechanism includes a gas introducing chamber into which gas generated by the inflator is introduced, wherein the gas guiding mechanism further includes at least one upper guiding hole, at least one lower guiding hole, and at least one intermediate guiding hole, wherein the upper, lower and intermediate guiding holes correspond to the upper, lower and intermediate portion, respectively, and guide gas from the gas introducing chamber to the corresponding portion, respectively, and wherein the opening area of the upper guiding hole and the opening area of the lower guiding hole are each greater than the opening area of the intermediate guiding hole.

6. The side airbag apparatus according to claim 2, wherein the gas guiding mechanism includes an upper gas injection portion and a lower gas injection portion provided in the inflator, and wherein the upper and lower gas injection portions correspond to the upper portion and the lower portion, respectively.

7. The airbag apparatus according to claim 1, further comprising an internal pressure control mechanism to control the internal pressure of the intermediate portion to be lower than the internal pressures of the upper and lower portions when the airbag is deployed.

8. The side airbag apparatus according to claim 7, wherein the internal pressure control mechanism includes a vent hole formed in a portion of the airbag that corresponds to the intermediate portion.

9. The side airbag apparatus according to claim 1, wherein the intermediate portion has an opening that communicates with the upper and lower portions, and wherein the opening is oriented in a direction either toward or away from the inflator.

10. The side airbag apparatus according to claim 9, wherein a flow guide is provided at the opening of the intermediate portion, the flow guide being for guiding gas toward the intermediate portion.

11. The side airbag apparatus according to claim 2, wherein the gas guiding mechanism includes a limiting mechanism, wherein, when the airbag is deployed, the limiting mechanism partially limits inflation of the airbag, thereby reducing an area of the airbag that contacts a flank of the occupant.

12. The side airbag apparatus according to claim 11, wherein the limiting mechanism includes a seam that is formed by facing portions of the airbag being partially sewn to each other.

13. The side airbag apparatus according to claim 12, wherein the seam includes a vertical seam portion that extends perpendicularly to ribs of the occupant when the airbag is deployed.

14. The side airbag apparatus according to claim 1, further comprising a limiting mechanism, wherein, when the airbag is deployed, the limiting mechanism limits bulging of the intermediate portion such that, over an entire area of the airbag, in the front and rear direction of the vehicle, the thickness of the intermediate portion is less than the maximum thickness of the upper and lower portions with respect to the horizontal direction between the occupant and the body side portion.

15. The side airbag apparatus according to claim 14, wherein the limiting mechanism includes a seam that is formed by facing portions of the airbag being partially sewn to each other.

16. The side airbag apparatus according to claim 14, wherein the limiting mechanism includes a constriction portion formed in a part of the airbag that corresponds to the intermediate portion.

17. The side airbag apparatus according to claim 16, wherein the portion of the airbag that corresponds to the constriction portion is formed of a material that is less stretchable compared to materials of which the upper and lower portions are formed.

18. The side airbag apparatus according to claim 1, further comprising a promoting mechanism, wherein, when the inflator generates gas, the promoting mechanism promotes inflation of the upper and lower portions compared to inflation of the intermediate portion.

19. The side airbag apparatus according to claim 18, wherein the promoting mechanism includes a seam that is formed by facing portions of the airbag being partially sewn to each other.

20. The side airbag apparatus according to claim 18, wherein the promoting mechanism includes a breakable fastener member, and wherein, prior to deployment of the airbag, the breakable fastener member fastens the airbag at a portion corresponding to the intermediate portion.

21. The side airbag apparatus according to claim 1, further comprising a delaying mechanism, wherein, when the inflator generates gas, the delaying mechanism delays inflation of the intermediate portion compared to inflation of the upper and lower portions.

22. The side airbag apparatus according to claim 1, wherein, when the airbag is deployed, the upper portion is located below a headrest of the seat.

23. The side airbag apparatus according to claim 1, wherein, when the airbag is deployed, the lower portion substantially reaches a seat portion of the seat.

24. The side airbag apparatus according to claim 1, wherein the airbag is formed by dividing a single bag, which extends from the position corresponding to the shoulder to the position corresponding to the lumber region, into the upper, lower and intermediate portions.

25. The side airbag apparatus according to claim 1, wherein each of the upper, lower and intermediate portions has a maximum projecting portion that most projects inwardly in the passenger compartment in a lateral direction of the vehicle, wherein the maximum projecting portions of the upper and lower portions are positioned inwardly of the maximum projecting portion of the intermediate portion in the passenger compartment.

26. The side airbag apparatus according to claim 25, wherein the maximum thickness portion of each of the upper, lower and intermediate portions has the maximum projecting portion.

27. The side airbag apparatus according to claim 1, wherein each of the upper, lower and intermediate portions has a maximum projecting portion that most projects toward the body side portion in a lateral direction of the vehicle, wherein the maximum projecting portions of the upper and lower portions are positioned closer to the body side portion than the maximum projecting portion of the intermediate portion is.

28. The side airbag apparatus according to claim 27, wherein the maximum thickness portion of each of the upper, lower and intermediate portions has the maximum projecting portion.

29. The side airbag apparatus according to claim 1, wherein the airbag includes a seam that is formed by facing portions of the airbag being partially sewn to each other to structurally separate the single airbag into the upper portion, the lower portion and the intermediate portion.

30. A side airbag apparatus used in a vehicle, comprising:
 a single airbag accommodated in a backrest of a seat located in a passenger compartment of the vehicle in a folded state;
 an inflator, wherein the inflator supplies gas to the airbag, thereby deploying the airbag between a body side portion of the vehicle and the seat, wherein
 the airbag is configured to include an upper portion, a lower portion, and an intermediate portion provided in the airbag and respectively opposed to a shoulder, a lumbar region and a thorax of an occupant sitting on the seat in a lateral direction of the vehicle when the airbag is deployed, wherein the upper, lower and intermediate portions are configured as structurally separate portions along at least an occupant impact side of the airbag, and have respective deployed thickness dimensions in a horizontal direction between the occupant and the body side portion, wherein a portion of the upper portion that has a maximum deployed thickness is located at a position that corresponds to the shoulder, a portion of the lower portion that has a maximum deployed thickness is located at a position that corresponds to the lumbar region, and the intermediate portion is located at a position that corresponds to the thorax and extends from a front end to a rear end of the airbag, and wherein, over the entire area of the airbag, in a front and rear direction of the vehicle, the deployed thickness of the intermediate portion is less than the maximum deployed thickness of the upper and lower portions, and the internal pressure of the intermediate portion is lower than the internal pressure of the upper and lower portions.

* * * * *